US011266912B2

(12) United States Patent
Dorn et al.

(10) Patent No.: US 11,266,912 B2
(45) Date of Patent: Mar. 8, 2022

(54) METHODS AND SYSTEMS FOR PROCESSING DISRUPTIVE BEHAVIOR WITHIN MULTI-PLAYER VIDEO GAME

(71) Applicant: Sony Interactive Entertainment LLC, San Mateo, CA (US)

(72) Inventors: Victoria Dorn, San Mateo, CA (US); Megumi Kikuchi, San Mateo, CA (US); Jing Li, San Mateo, CA (US); Tomoyo Kimura, San Mateo, CA (US); Yinghui Xia, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/888,707

(22) Filed: May 30, 2020

(65) Prior Publication Data

US 2021/0370183 A1 Dec. 2, 2021

(51) Int. Cl.
| | | |
|---|---|---|
| *A63F 13/75* | (2014.01) | |
| *A63F 13/79* | (2014.01) | |
| *A63F 13/35* | (2014.01) | |
| *A63F 13/87* | (2014.01) | |
| *G06N 20/00* | (2019.01) | |
| *A63F 13/335* | (2014.01) | |

(52) U.S. Cl.
CPC .......... *A63F 13/75* (2014.09); *A63F 13/335* (2014.09); *A63F 13/35* (2014.09); *A63F 13/79* (2014.09); *A63F 13/87* (2014.09); *G06N 20/00* (2019.01); *A63F 2300/303* (2013.01); *A63F 2300/535* (2013.01); *A63F 2300/5546* (2013.01)

(58) Field of Classification Search
None
See application file for complete search history.

(56) References Cited

U.S. PATENT DOCUMENTS

| | | | | |
|---|---|---|---|---|
| 10,600,063 B2* | 3/2020 | Bracher | ............... | H04M 15/43 |
| 10,776,708 B2* | 9/2020 | Lospinoso | ............ | G06N 7/005 |

(Continued)

OTHER PUBLICATIONS

PCT Application No. PCT/US2021/033884, International Search Report and Written Opinion, dated Sep. 9, 2021.

*Primary Examiner* — Ronald Laneau
(74) *Attorney, Agent, or Firm* — Penilla IP, APC

(57) ABSTRACT

Disruptive behavior events are identified within an online gaming system. Players responsible for the identified disruptive behavior events are verified. A behavioral designation is applied to players in the online gaming system. The behavioral designation indicates whether or not a player is verified as responsible for one or more of the identified disruptive behavior events. Current real-time player behavior demographic data is generated for a specified game space using the behavioral designations applied to players associated with the specified game space. The generated current real-time player behavior demographic data for the specified game space is displayed to players associated with the specified game space. Using current real-time player behavior demographic data generated and displayed for different game spaces, a player is enabled to make a behavior-informed selection of a game space in which to enter for game play. Also, player behavioral profiles enable tracking of player-specific behavior preferences and events.

35 Claims, 13 Drawing Sheets

(56) References Cited

U.S. PATENT DOCUMENTS

| | | |
|---|---|---|
| 2003/0216962 A1 | 11/2003 | Heller et al. |
| 2017/0225079 A1 | 8/2017 | Conti et al. |
| 2017/0279616 A1* | 9/2017 | Loeb ..................... H04L 67/02 |
| 2020/0078688 A1 | 3/2020 | Kaethler et al. |

* cited by examiner

Rewards

| Reward ID | Date/Time | Reward Description | Evidence | Reward |
|---|---|---|---|---|
| Rwd_044 | 06/10/2019 3:20 pm | Team Play | Link | Link |
| ⋮ | ⋮ | ⋮ | ⋮ | ⋮ |
| Rwd_182 | 05/15/2020 12:30 pm | Helper | Link | Link |

Behavior Preferences

| Unacceptable Behaviors | Acceptable Behaviors |
|---|---|
| ☐ Arguing | ☒ Arguing |
| ☒ Cursing | ☐ Cursing |
| ⋮ | ⋮ |
| ☐ Zoning | ☐ Zoning |

Disruptive Behavior Tolerance Setting: 3

Behaviorally Marked Players

| Player ID | Behavior Description | Edit | Delete |
|---|---|---|---|
| Ashley_24 | Very Good | Link | Delete |
| ⋮ | ⋮ | ⋮ | ⋮ |
| Rob_90 | Bad | Link | Delete |

Fig. 4B

Game Rooms Available for "Game X"

| Game Room ID 603 | Behavioral Summary of Room 605 | | | | | | |
|---|---|---|---|---|---|---|---|
| | # Disruptive Players 611 | Total # Players 613 | Probability of Encountering Disruptive Player 615 | Density of Disruptive Players 617 | Average Behavior Score 619 | List of Disruptive Players 621 | Behavior Status Indicator 607 | Room Minimap 609 |
| Rm_77 | 21 | 343 | 6% | 6 per 100 | 87 | Link | ← | Link |
| ••• | ••• | ••• | ••• | ••• | ••• | ••• | ••• | ••• |
| Rm_626 | 277 | 300 | 92% | 92 per 100 | 32 | Link | → | Link |

Fig. 6A

METHODS AND SYSTEMS FOR PROCESSING DISRUPTIVE BEHAVIOR WITHIN MULTI-PLAYER VIDEO GAME

BACKGROUND

The video game industry has seen many changes over the years and has been trying to find ways to enhance the video game play experience for players and increase player engagement with the video games and/or online gaming systems. When a player increases their engagement with a video game, the player is more likely to continue playing the video game and/or play the video game more frequently, which ultimately leads to increased revenue for the video game developers and providers and video game industry in general. Therefore, video game developers and providers continue to seek improvements in video game operations to provide for increased player engagement and enhanced player experience.

A growing trend in the video game industry is online harassment and cyberbullying in video games by players commonly referred to as abusive players, bad faith players, griefers and/or disruptive players. For example, a disruptive player can be a player in a multiplayer video game who deliberately irritates, annoys, and harasses other players within the video game. In some instances, the disruptive player will use aspects of the video game in unintended ways to disrupt normal play of the video game. The disruptive actions by disruptive players in the video game can prevent other good faith players from becoming fully immersed in their play of the video game, and thereby diminish the good faith player's game play experience. Unfortunately, identifying disruptive players and monitoring their actions during their play of the video game can be difficult and can utilize a significant amount of resources, including computing resources, human resources, energy resources, economic resources, data storage resources, and data communication bandwidth resources, among other types of resources. Therefore, management of disruptive players in video games is not currently done as well as possible. It is within this context that implementations of the present disclosure arise.

SUMMARY

In an example embodiment, a method is disclosed for processing disruptive behavior within an online gaming system. The method includes identifying disruptive behavior events within the online gaming system. The method also includes verifying players responsible for the identified disruptive behavior events. The method also includes applying a behavioral designation to players in the online gaming system. The behavioral designation indicates whether or not a player is verified as responsible for one or more of the identified disruptive behavior events. The method also includes generating current real-time player behavior demographic data for a specified game space using the behavioral designations applied to players associated with the specified game space. The method also includes displaying the generated current real-time player behavior demographic data for the specified game space to players associated with the specified game space.

In an example embodiment, a method is disclosed for behavior-based game room selection in an online gaming system. The method includes generating current real-time player behavior demographic data for each of a plurality of online game rooms. The method also includes displaying the generated current real-time player behavior demographic data for each of the plurality of online game rooms to a player. The method also includes processing a selection by the player of a selected one of the plurality of online game rooms. The processing of the selection by the player places the player within the selected one of the plurality of online game rooms.

In an example embodiment, an online gaming system is disclosed. The online gaming system includes a computer memory that includes computer executable program instructions for processing disruptive behavior within the online gaming system. The computer executable program instructions include program instructions for identifying disruptive behavior events within the online gaming system. The computer executable program instructions include program instructions for verifying players responsible for the identified disruptive behavior events. The computer executable program instructions include program instructions for applying a behavioral designation to players in the online gaming system. The behavioral designation indicates whether or not a player is verified as responsible for one or more of the identified disruptive behavior events. The computer executable program instructions include program instructions for generating current real-time player behavior demographic data for a specified game space using the behavioral designations applied to players associated with the specified game space. The computer executable program instructions include program instructions for displaying the generated current real-time player behavior demographic data for the specified game space to each player associated with the specified game space.

In an example embodiment, an online gaming system is disclosed. The online gaming system includes a computer memory that includes computer executable program instructions for behavior-based game room selection in the online gaming system. The computer executable program instructions include program instructions for generating current real-time player behavior demographic data for each of a plurality of online game rooms. The computer executable program instructions include program instructions for displaying the generated current real-time player behavior demographic data for each of the plurality of online game rooms to a player. The computer executable program instructions include program instructions for processing a selection by the player of a selected one of the plurality of online game rooms. The processing of the selection by the player places the player within the selected one of the plurality of online game rooms.

BRIEF DESCRIPTION OF THE DRAWINGS

FIGS. 4A and 4B show an example of a player behavior profile, in accordance with some embodiments.

FIG. 6A shows a GUI for enabling behavior-based game room selection by a player, in accordance with some embodiments.

DETAILED DESCRIPTION

In the following description, numerous specific details are set forth in order to provide a thorough understanding of the present disclosure. It will be apparent, however, to one skilled in the art that embodiments of the present disclosure may be practiced without some or all of these specific details. In other instances, well known process operations have not been described in detail in order not to unnecessarily obscure the present disclosure.

Figure 1:
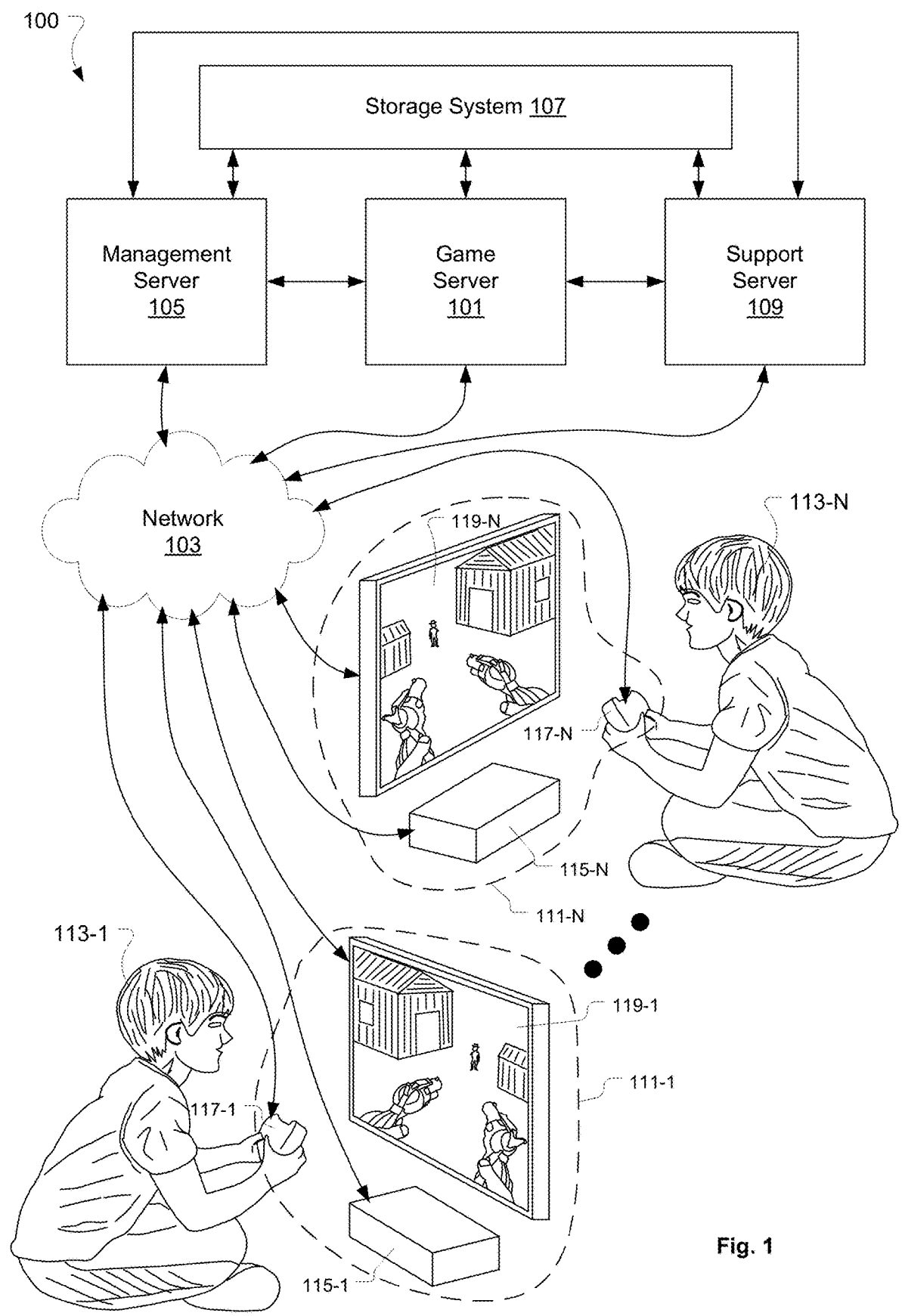
FIG. 1 shows an overview of an online gaming system for serving online multiplayer video games, in accordance with some embodiments.

An online multiplayer video game can include multiple players interacting within a common game context. The online multiplayer video game is executed on one or more server computing systems that function to generate and stream video game content to each player, where the video game content for a given player is unique to the given player's situation and point of view within the common game context. FIG. 1 shows an overview of an online gaming system 100 for serving online multiplayer video games, in accordance with some embodiments. The online gaming system 100 includes one or more game server(s) 101 connected for bi-directional data communication with a network 103, such as the Internet. In some embodiments, the game server 101 is a computing device configured to execute the online multiplayer video game, or some portion of the online multiplayer video game. In some embodiments, one or more management server(s) 105 is/are connected for bi-directional data communication with the game server 101 and for bi-directional data communication with the network 103. The management server 101 can be configured to handle overhead tasks associated with the online gaming system 100, such as handling of game selection requests and placement of players in various game sessions or game rooms, by way of example. In various embodiments, the management server 105 is configured to handle essentially any task needed to support operation of the online gaming system 100 and game play. The online gaming system 100 also includes one or more storage system(s) 107 connected for bi-directional data communication with the game server 101 and for bi-directional data communication with the management server 105. The storage system 107 functions to store data associated with games served by the online gaming system 100 and data associated with players that engage with the online gaming system 100. In various embodiments, the online gaming system 100 includes one or more additional support server(s) 109 in bi-directional data communication with one or more of the game server 101, the management server 105, and the storage server 107. In various embodiments, the support server 109 is configured to assist with essentially any computing task associated with operation of the online gaming system 100.

The online gaming system 100 is configured to simultaneously receive data communication from and send data communication to computing devices 111-1 through 111-N local to and respectively operated by a number (N) of multiple players 113-1 through 113-N. In some embodiments, the game server 101 is used to perform operations of a durational information platform for video game players. Online video games played over the Internet operate through a connection to the game server 101. Typically, online games use a dedicated server application that collects data from and distributes data to the players 113-1 through 113-N. The computing devices 111-1 through 111-N are respectively connected to the network 103 to enable data communication to and from the online gaming system 100. In various embodiments, the data communication between the computing devices 111-1 through 111-N and the network is implemented through any known data communication means, such as transmission of signals through wires or through the air by wireless means, such as through WIFI, BLUETOOTH, cellular, radio, optical, satellite, and/or other wireless communication systems. In various embodiments, the computing devices 111-1 through 111-N include game system consoles 115-1 through 115-N and/or control devices 117-1 through 117-N and/or television/display systems 119-1 through 119-N. In various embodiments, the control devices 117-1 through 117-N include one or more of a game controller, a keyboard, a head-mounted display (HMD) device, and a game input device (such as a wand, pointer, bat, club, racket, paddle, gun, steering device, pedal device, or any other form of game input/control device), or other type of control device. In some embodiments, the television/display systems 119-1 through 119-N are connected to one or more ancillary computing/communication devices, such as a dongle, to enable data communication between any two or more of the television/display systems 119-1 through 119-N, the control devices 117-1 through 117-N, the game system consoles 115-1 through 115-N, and the network 103.

Many online multiplayer video games provide for interaction between multiple players 113-1 through 113-N, which can include opposing game play, individual game play, and/or team game play. Also, many online multiplayer video games provide for communication between players 113-1 through 113-N, where the players can be either opposing each other, or on the same team, or acting as an independent player within a given game context. Such player-to-player communication can be done by chat/text communication, voice communication, or other types of data/content communication, e.g., picture, video, emoticon, etc., depending on what the game allows and/or what the online gaming system 100 allows. Interactivity and communication between players 113-1 through 113-N in online multiplayer video games can significantly improve the richness of the game experience. However, the interactivity and communication between players 113-1 through 113-N in online multiplayer video games also provides opportunities for disruptive behavior, which may detract from or diminish the game experience of some players and/or interfere with proper and efficient operation of the online gaming system 100, and particularly of the game server 101 and/or storage system 107.

In some instances, disruptive player behavior in online multiplayer video games can interfere with normal game flow and/or with normal game execution by the game server 101. For example, if a player discovers and exploits a bug or a glitch in the online game, corresponding computational pressure on the game server 101 can increase to a point where the ability of the online game system 100 to serve games to other players is adversely affected. Also, in another example, if a player intentionally disrupts the normal game flow by performing unwarranted actions and/or actions of sabotage, the computational pressure on the game server 101 is unnecessarily increased, which is a waste of resources, energy consumption, and time. Also, if a player intentionally disrupts the normal game flow by performing unwarranted actions and/or actions of sabotage, the data associated with those actions is stored in the storage system 107, which is an unnecessary waste of storage resources and an unnecessary consumption of valuable data communication bandwidth with the storage system 107.

In some instances, disruptive player behavior in online multiplayer video games can be toxic or abusive, and require corrective action such as suspension or banning of a player from the online multiplayer video game. But, not all disruptive behavior within the online multiplayer video gaming context warrants suspension or banning of a player from the online multiplayer video game. There is usually a progression of disruptive behavior within a given game context. Also, some games may intentionally allow for more disruptive behavior than other games, especially when considering how games are developed for play by people of different ages. There may be players within the online multiplayer video game that are considered disruptive players for one or more reasons, but have not reached a level of disruptive behavior that warrants suspension or banning. Therefore, it is almost inevitable that in most online multiplayer video games, a given player will encounter one or more other players that exhibit some type of disruptive behavior. It is of interest to provide systems and methods for identifying, tracking, and conveying information about disruptive behavior within a given game context, so that players can make informed decisions to control the level of disruptive behavior to which they are exposed during game play, and thus improve their overall gaming experience. Moreover, by enabling players to have control over the level of disruptive behavior to which they are exposed during game play, it is possible to improve the performance of game execution and associated data storage on the server. For example, by enabling players to have control over the level of disruptive behavior to which they are exposed during game play, it is possible to reduce the overall game session ingress and egress transaction overhead that is incurred when players move between game sessions because of exposure to disruptive behavior by other players.

A disruptive behavior by a player can occur on a system level or within a particular game context, or both. A disruptive behavior is essentially any behavior that violates the Code of Conduct of the gaming system provider and/or that disrupts normal and fair game play. For example, disruptive behavior includes offensive communication over voice chat and/or text chat, or through use of emoticons, or by any other communication means. Disruptive behavior also includes abuse of game mechanics/actions, such as inappropriate game actions, not completing in-game tasks when required, causing an in-game entity to die or be eliminated on purpose, and not acquiring an in-game asset when possible, among others. Disruptive behavior also includes abusive player-to-player interaction and griefing, such as tripping, blocking, killing, sabotaging, and spying, among others. Disruptive behavior also includes abuse, harassment, or stalking of another player. Disruptive behavior also includes an action, upload, post, stream, or transmission of any content, language, images, or sounds that are offensive, hateful, or vulgar, as determined by the online gaming system 100 provider/authority. Disruptive behavior also includes any player communication or content provision that is deemed racially, ethnically, religiously or sexually offensive, libelous, defaming, threatening, bullying or akin to stalking, as determined by the online gaming system 100 provider/authority. Disruptive behavior also includes any player communication that attempts to organize a hate group. Disruptive behavior also includes an action that is disruptive to the normal flow of chat or gameplay, as determined by the online gaming system 100 provider/authority, including uploading, posting, streaming, or transmitting any unsolicited or unauthorized material, including junk mail, spam, excessive mail or chain letters. Disruptive behavior also includes transmission of content that is commercial in nature such as advertisements, solicitations, promotions, or links to web sites. Disruptive behavior also includes impersonation of any person or player or online gaming system 100 authority. Disruptive behavior also includes cheating, exploiting, or using any bugs, glitches, vulnerabilities or unintentional game mechanics to obtain an unfair advantage or interfere with normal game flow and operation. Disruptive behavior also includes use of hate speech, such as use of racist slurs or uploading prejudiced content. Disruptive behavior also includes threatening of other users/players, such as threatening to harm them physically or making them feel unsafe in any way. Disruptive behavior also includes bullying of other users, such as making fun of their personal beliefs, physical traits, or gaming ability. Disruptive behavior also includes promotion of vulgar or offensive content, such as creating an inappropriate online ID, even if the offensive word is only hinted or implied. Disruptive behavior also includes posting of erotic or pornographic imagery. Disruptive behavior also includes encourage self-harm or suicide. Disruptive behavior also includes participating in illegal acts, such as using the gaming system communication mechanisms to sell drugs or other illegal products. Disruptive behavior also includes violating another's privacy, such as sharing their personal details or photos on the gaming system. Disruptive behavior also includes disrupting the gaming experience of others by being loud, rude, or purposely annoying. And, disruptive behavior includes any behavior that would violate local, state, or federal laws.

It is clear from the foregoing that different types of disruptive behaviors can be more serious than other types of disruptive behaviors. For example, a player uploading pornographic imagery or selling drugs through a communication mechanism in the online gaming system 100 is much more serious that a player saying a curse word through a communication mechanism in the online gaming system 100. The online gaming system 100 provider is the authority for ranking the severity of various disruptive behaviors. In some embodiments, the different degrees of severity associated with the different types of disruptive behaviors can be accounted for by applying different weightings to different types of disruptive behaviors in generating a behavior score for each player 113-1 through 113-N. In some embodiments, the behavior score for a given player 113-1 through 113-N can be calculated by summing the number of occurrences of disruptive behavior by the given player within a specified time period, with each occurrence of disruptive behavior being weighted in the sum by the severity of the disruptive behavior. In this manner, a disruptive player (disruptor) can be characterized by the number and severity of disruptive behavior events that they have verifiably committed within the specified time frame. In some embodiments, the behavior score ($BS_{P\_\Delta t}$) for a given player (P) over a specified time period ($\Delta t$) can be calculated as shown in Equation 1, where (E) is a total number of disruptive behavior events verified for the player (P) within the specified time period ($\Delta t$), ($n_e$) is a number of occurrences of a particular type of disruptive behavior event (e) within the specified time period ($\Delta t$), and ($w_e$) is a weighting of severity given to the particular type of disruptive behavior event (e), where ($w_e$) is within a range extending from 0 to 1, with 0 being a minimum level of severity for the particular type of disruptive behavior event (e), and 1 being a maximum level of severity for the particular type of disruptive behavior event (e). The behavior score ($BS_{P\_\Delta t}$) for the given player (P) over the specified time period ($\Delta t$) ranges from 0 to 100, where 100 is a best possible behavioral score (best behavior possible), and where 0 is a worst possible behavior score.

$$BS_{P\_\Delta t} = \left(1 - \frac{\sum_{e=1}^{E}(n_e w_e)}{\sum_{e=1}^{E} n_e}\right)100. \quad \text{Equation 1}$$

Some online multiplayer video games can maintain a behavioral framework that classifies behaviors that are allowable/tolerated and behaviors that are not allowed/tolerated. In various embodiments, the behavioral framework for a given online multiplayer video game considers player behaviors associated with game mechanics, player in-game actions, player-to-player interactions, and/or player-to-player communications. The behavioral framework for a given online multiplayer video game can be coded in by game developers and communicated to players, so players know what behaviors are allowed/tolerated and what behaviors are not allowed/tolerated. Also, because some online multiplayer video games provide a better gaming experience with more aggressive/chaotic behavior than others, some games may have a higher allowance/tolerance for what is considered disruptive behavior than other games. The determination of what level of disruptive behavior is allowed/tolerated for a given game can be specified by setting of the various severity weightings ($w_e$) for the different types of disruptive behavior events (e), for use in calculating the behavior score ($BS_{P\_\Delta t}$) for players within the given game. The game development studio can determine what player behaviors and/or thresholds of player behaviors would be considered as flaggable disruptive behavior in the particular game context. Therefore, in some embodiments, the behavioral framework for a given game can include some classification of disruptive behavior that is allowed/tolerated within the context of the given game. This behavioral framework can be defined at the developer level and may or may not be hidden from the game players. In some embodiments, the behavioral framework of a given game can be revealed to players without specifying which disruptive behaviors are acceptable/tolerated. For example, in some embodiments, a game can have a disruptive behavior ranking, such as within a range of 1 to 5, with 1 being a minimum amount of allowable/tolerated disruptive behavior and 5 being a maximum amount of allowable/tolerated disruptive behavior. Also, it should be understood that other ways of ranking/classifying the disruptive behavior allowance/tolerance of a given game are possible, with the above-mentioned 1 to 5 numerical ranking being one example of many possibilities.

With various types of disruptive behaviors identified and with a mechanism in place for generating the behavior score ($BS_{P\_\Delta t}$) for each player, another challenge is to determine when a disruptive behavior is committed by a player. One way of determining when a disruptive behavior is committed by a player is to have it reported by another player, who may have been a witness to the disruptive behavior or a victim of the disruptive behavior. This player reporting approach is discuss in more detail below with regard to FIG. 2. Before that, however, another way of determining when a player commits a disruptive behavior is to use machine learning. Generally speaking, in machine learning, a computer is used to execute algorithms and statistical models that extract patterns and learn relationships within a data set without being specifically programmed as to which patterns and relationships are to be extracted and learned. In machine learning, large amounts of historical data is processed through the machine learning algorithms to detect patterns and relationships within the data. Once the machine learning algorithms are sufficiently trained with enough data, a machine learning model is developed that can be used to predict future outcomes and/or determine a probability that an asserted event actually occurred. In a classification type of machine learning model, the machine learning algorithms are given a current data observation and in response determine which class, of a set of pre-defined classes, the current data observation belongs. In a regression type of machine learning model, relationships are determined between multiple variables. Each variable-to-variable relationship is weighted based on the frequency of occurrence of the variable-to-variable relationship within the data set used to train and/or update the machine learning model. The determined relationships can be used to predict the value(s) of one or more variables based on current data observations of one or more correlated variables. In a clustering type of machine learning model, similar types of data are grouped into clusters. With this model, the cluster to which a given current data observation best fits can be identified and used to inform a principle or decision associated with a current data observation. Also, the clustering type of machine learning model is particularly useful for determining whether or not a current data observation is an outlier or fraudulent data. It should be understood that, in addition to the foregoing, there are many other types of machine learning models in existence.

In some embodiments, a machine learning model includes feature extractors and classifiers. The feature extractors are algorithms that take in raw data, whether historic or current, and extract features from the raw data. For a machine learning model developed and used in the context of online gaming, the raw data includes game telemetry data, which includes data about every aspect of the game play as a function of time. The raw data also includes game state data that keeps track of what each player is doing in the game as function of time. The raw data also includes player state data for each player. The player state data for a given player includes data that describes every aspect about the given player and what the given player has done in the game as a function of time. In various embodiments, the raw data can include any type of data associated with game play and with each player.

The features that are extracted from the raw data define particular events and/or actions that occurred during game play. The extracted features are provided as input to the classifier algorithm. The classifier algorithm operates to classify the extracted features. In some embodiments, classifier algorithms are defined to determine whether or not extracted features belong to a disruptive behavior classification, and if so, correlate the extracted features to the determined disruptive behavior classification. For example, if an extracted feature shows that a player blocked a teammate player from advancing to score in a game, that extracted feature can be classified in a disruptive behavior classification for interfering with normal flow of game play, and/or may be classified in a disruptive behavior classification for griefing. Once the machine learning model is sufficiently trained by processing a sufficient amount of raw data, past and/or current data observations from the game can be processed through the machine learning model to automatically determine whether or not any disruptive behavior has occurred. If the machine learning model determines that disruptive behavior has occurred, a notification can be sent to the online gaming system 100 and/or to the game being played, and the online gaming system 100 and/or the game being played can take appropriate action to respond to the disruptive behavior that has occurred. It should be understood that the machine learning model continuously learns as raw data continues to be supplied to the machine learning model from ongoing game play.

In some embodiments, the machine learning model takes in the raw data as input, extracts the features the raw data, classifies the features and determines what is likely to happen within the game in a given context of the game. In some embodiments, the machine learning model includes many nodes, where each node corresponds to an extracted feature. Each node is connected to every other node. The connections between nodes represent feature-to-feature relationships. Each connection between nodes has a corresponding weighting. The weighting between nodes increases when the corresponding feature-to-feature relationship occurs more often in the raw data. Also, the weighting between nodes decreases when the corresponding feature-to-feature relationship occurs less often in the raw data. In the machine learning model, data patterns cause reinforcement of relationships between nodes. In the context of online gaming, the machine learning model considers not only the actions/events that happen in the game, but also the game context surrounding those actions/events. In some embodiments, the machine learning model can be trained to identify actions/events within the game that are disruptive behaviors. And, in turn, the machine learning model can be trained to automatically identify when disruptive behavior occurs in real-time, and which players in the game are disruptive players.

In some embodiments, the machine learning model is supervised by human moderators, which verify the accuracy of the machine learning model's identification of disruptive behavior within the game. In the event that the moderator determines that the machine learning model incorrectly identified an action/event as a disruptive behavior, the moderator can send that information back into the machine learning model as feedback data so that the machine learning model can adjust the relationship weighting(s) for that particular action/event. More specifically, when the machine learning model receives feedback data from the moderator and/or game and/or online gaming system 100, the machine learning model adjusts the weighting(s) between nodes to reflect the correct behavior and/or correct feature-to-feature relationships.

In some embodiments, the machine learning model can be trained to identify characteristics of players that are indicative of a disruptive player. In some embodiments, the machine learning model can classify each player in the game based on in-game actions and input from other players in the game. For example, the machine learning model can identify a relationship between a disruptive player classification and a lack of friend requests within the gaming system. The machine learning model can analyze each player's performance by looking at the player's video stream(s), the player's metadata, the player's game state data, the game telemetry, etc., to identify player actions that may correspond to disruptive behavior. The machine learning model determines whether or not the actions performed by players in the game are inconsistent with expected game mechanics, and/or are causing other players difficulty, and/or are causing other players to quit the game. For example, as a possible indicator of disruptive behavior, the machine learning model can detect that every time a certain player starts playing in a given game session, other players in the given game session quit playing.

In some embodiments, crowd-sourced data specifying disruptive behaviors and non-disruptive behaviors can be provided as input to the machine learning model to enable the machine learning model to learn what constitutes acceptable and non-acceptable behavior in the eyes of the players. Then, the raw data associated with the players at higher risk of being disruptors can be given processing priority through the machine learning model. Also, in some embodiments, the machine learning model can be trained to learn player preferences with regard to disruptive behavior. For example, some players may not mind or may even prefer some amount of disruptive behavior from other players. But, some players may prefer no disruptive behavior from other players. The machine learning model will find these relationships and classify the players according to their disruptive behavior tolerance level. For example, whenever a player exits a game session (or game room) the machine learning model can determine how strong the relationship is between the player exiting the game session and the behavioral demographics of players within the game session. In this manner, if a player often leaves a game session because of disruptive behavior by other game players, the machine learning model will pick up this relationship and weight it accordingly. Then, based on data such as the player's disruptive behavior tolerance level, the gaming system can provide suggestions and/or rankings of selectable options to the player that reflects the player's disruptive behavior tolerance level. For example, if a player cannot tolerate disruptive behavior, the online game system 100 may suggest a game session for the player that only includes players that have a very high behavior score ($BS_{P\_At}$).

Once a possible disruptive behavior is detected by the machine learning model and/or flagged by a player within the gaming system, a verification process is performed to verify that the possible disruptive behavior actually occurred. This verification process is done in the interest of due process for the accused disruptive player. This verification process is also done to prevent the disruptive behavior flagging process from being weaponized by players and/or from being used to exact an agenda, such as unjust targeting of good players with disruptive behavior accusations in order to shift the balance of play within a game or to enact some popularity-based agenda. The verification process is performed by a moderator. In some embodiments, the moderator is a human moderator. In some embodiments, the human moderator is associated directly with the online gaming system 100 provider/authority. In some embodiments, the human moderator is a partner of the online gaming system 100 provider/authority.

The possible disruptive behavior information and associated evidence is sent to or made available to the moderator for review. In some embodiments, the evidence includes a statement by the player that flagged the disruptive behavior. Also, in some embodiments, the evidence includes a saved portion of the video stream of the game play during which the possible disruptive behavior occurred. In some cases, it is possible to analyze relevant frames within the video stream to determine whether or not the possible disruptive behavior actually occurred. Also, in some embodiments, the evidence includes a record of the chat or text stream in which the possible disruptive behavior occurred. Also, the evidence can include game telemetry data associated with the game play at the time when the possible disruptive behavior occurred. Once the evidence is made available to the moderator, the moderator reviews the evidence to either confirm or refute the possible disruptive behavior. Once the moderator has completed the verification process, data for the possible disruptive behavior description, the associated evidence, and the verification process result can be provided as input for consumption by the machine learning model.

In some embodiments, crowd-sourcing is used as a moderator to perform the verification process on the possible disruptive behavior. In some embodiments, a group of players forms a crowd-sourced review panel to perform a crowd-sourced moderation review of the possible disruptive behavior. In these embodiments, evidence is provided to the players that constitute the crowd-sourced review panel. The evidence can be consolidated and organized in a manner that is easily reviewable by the crowd-sourced review panel. For example, each member of the crowd-sourced review panel can be provided with a written and/or audio description of the possible disruptive behavior in question, and can also be provided with a clip from the video stream and/or portion of the chat/text stream during which the possible disruptive behavior supposedly occurred. After reviewing the evidence, each member of the crowd-sourced review panel can render their judgement by vote to confirm or deny the possible disruptive behavior. In some embodiments, the final judgement on the confirmation or denial of the possible disruptive behavior can be in accordance with a majority decision of the crowd-sourced review panel. In other embodiments, confirmation of the possible disruptive behavior can require unanimous confirmation by all members of the crowd-sourced review panel. In some embodiments, the determination of whether a majority decision or unanimous decision is required to confirm the possible disruptive behavior is based on the severity of the possible disruptive behavior and/or the corresponding consequences associated with confirmation of the possible disruptive behavior. For example, if the consequence of the possible disruptive behavior is banning of the player from the online gaming system 100 for life, it may be determined that a unanimous confirmation decision is required by the crowd-sourced review panel. As another example, if the consequence of the possible disruptive behavior is a warning of the player, it may be determined that a majority confirmation decision is required by the crowd-sourced review panel. Once the crowd-sourced review panel has completed the verification process, data for the possible disruptive behavior description, the associated evidence, and the verification process result can be provided as input for consumption by the machine learning model.

In some embodiments, either as an alternative to or in addition to human moderation, the machine learning model is used as a moderator to perform the verification process for the possible disruptive behavior. In these embodiments, all of the appropriate evidence surrounding the possible disruptive behavior, such as game telemetry data, user data, player state data, saved video stream data, saved chat/text stream data, etc., is provided as input to the machine learning model. The machine learning model operates to determine whether or not the possible disruptive behavior does indeed fall into a disruptive behavior classification. In some embodiments, if the machine learning model is used first for the verification process, the results from the machine learning model verification process can be forwarded along with the associated description of the possible disruptive behavior and associated evidence to either a human moderator and/or a crowd-sourced review panel for a second level confirmation.

In various embodiments, the repercussions from receiving a confirmed disruptive behavior judgement can be enacted within the game and/or within the online gaming system 100 through which the game is provided. In some embodiments, when the disruptive behavior is confirmed, the game can be notified through an application programming interface (API) of the confirmed disruptive behavior judgement on the guilty player. In some embodiments, the game is programmed to enforce punitive actions against the guilty player, such as a loss of privileges in the game (e.g., loss of chat privileges, loss of posting privileges, among others), and/or restriction of game play within the game (e.g., restriction to a certain level of game play for a specified amount of active gaming time, among others), and/or scaling down of player ability/strength/assets within the game context, among others. In some embodiments, the player responsible for the confirmed disruptive behavior is provided a notification before being marked and/or penalized within the game and/or gaming system. In some embodiments, this notification will provide the player responsible for the confirmed disruptive behavior with access to evidence used in the moderation process. In some embodiments, the player responsible for the confirmed disruptive behavior can select whether to mount a defense against the confirmation decision or accept the confirmation decision. If the player mounts a defense against the confirmation decision, the player will be required to submit to the online gaming system 100 an explanation as to why the confirmation decision was in error, and any associated evidence, if available, such as saved video clips, saved audio, saved chat streams, etc. Upon receipt of the player's defense and associated evidence, a human moderator (preferably different from the moderator that previously confirmed the disruptive behavior) will review the player's defense in view of the all the original material considered in the previous moderation and render a judgement. In some embodiments, this second judgement will be final.

Once the player either accepts the confirmation decision regarding their disruptive behavior or receives a final judgement affirming the confirmation decision regarding their disruptive behavior, the corresponding repercussions for the disruptive behavior are carried out. Some confirmed disruptive behaviors are so egregious that immediate suspension or banning of the player from the online gaming system 100 is warranted and carried out. Such banning of a player from a particular game and/or from the online gaming system 100 may be forever or for a specified period of time. However, most confirmed disruptive behavior is likely to be of a minor-to-moderate nature that leaves an opening for possible rehabilitation of the player. As previously mentioned, in some embodiments, the repercussions can include in-game restrictions/punishments on the player. In some embodiments, a progressive system of repercussions is implemented, of course depending on the severity of the disruptive behavior. For example, a first confirmed disruptive behavior of a minor nature by a player may simply result in the player receiving a warning from the game and/or the online gaming system 100. In some embodiments, the warning will describe the confirmed disruptive behavior, including when it occurred and what it was, and explain the next level of repercussion if the disruptive behavior happens again. In some embodiments, the confirmed disruptive behavior can also be recorded in a behavioral profile of the guilty player.

In some embodiments, the gaming system will offer some form of training to help the player understand the confirmed disruptive behavior and how to avoid doing the disruptive behavior again. For example, if the confirmed disruptive behavior was interference with normal game flow by not picking up a game asset when clearly possible to do so in order to assist the player's team in progressing in the game, the gaming system can provide an explanation of this disruptive behavior to the player and also provide an explanation and/or demonstration to the player of how to pick up the game asset when possible. In this sense, the rehabilitation of confirmed disruptive players can include coaching to improve the playing ability of the confirmed disruptive players. In some cases, the game system can provide an incentive to a confirmed disruptive player for them to improve their behavior. For example, the game system can offer a tutorial on proper game play to a confirmed disruptive player, with the incentive being that upon completion of the tutorial, the game system will notify the game through the API, and the game will reduce or eliminate the enacted punitive measure(s) against the confirmed disruptive player. It should be understood that this is one example of many possible ways by which confirmed disruptive players can be incentivized within the online gaming system 100 to improve their in-game behavior.

In some embodiments, depending on the game, a player may have to do a threshold number/level of disruptive behaviors in a given game session before being penalized. In some embodiments, this threshold number/level of disruptive behaviors is determined by the behavior score ($BS_{P\_A_t}$) of the player dropping below a set level, such as 20, by way of example. In some embodiments, depending on the game, a confirmed disruptive player can be penalized by being removed from the current game session in which the disruptive behavior occurred and placed into another game session. In some embodiments, the game session into which the confirmed disruptive player is placed includes other confirmed disruptive players. In some embodiments, a confirmed disruptive player can be penalized by having some previously earned trophy or accolade removed from their profile.

In some embodiments, identifying disruptive behavior, confirming the disruptive behavior, and punishing the player responsible for the confirmed disruptive behavior is not enough to protect the victim of the confirmed disruptive behavior from receiving additional disruptive behavior from the guilty player and/or is not enough to make the victim of the confirmed disruptive behavior comfortable within the game context and/or gaming system. Therefore, in some embodiments, the victim of the confirmed disruptive behavior can be selectively aliased within the game with respect to the player that was found guilty of the confirmed disruptive behavior. More specifically, the avatar, online identifier, and/or other identifying image or information about the victim of the confirmed disruptive behavior can be aliased within the game, but just with respect to the player that was found guilty of the confirmed disruptive behavior. In other words, the selective aliasing of the victim of the confirmed disruptive behavior is not apparent to players of the game who are not the player that was found guilty of the confirmed disruptive behavior. The aliasing of the victimized player is only shown to the player that was found guilty of disruptive behavior against the victimized player. In this manner, the victim of the confirmed disruptive behavior is able to present them self as normal to all players in the game except the player that was found guilty of the confirmed disruptive behavior against the victim. To the guilty player, the victim of the confirmed disruptive behavior appears as a different player in accordance with their aliasing. In some embodiments, once the possible disruptive behavior is confirmed through moderation, the victim of the confirmed disruptive behavior is given an option to request aliasing from the player guilty of the confirmed disruptive behavior. This option can be unselected by the victim of the confirmed disruptive behavior at any time. In some embodiments, the controls for aliasing from one or more players is provided in the player profile. In some embodiments, the alias given to the victimized player is generated randomly by the game or the online game system 100 each time the player logs in to play.

It should be understood that just as disruptive behaviors with the game context can be detected by the machine learning model and/or reported by a player, with subsequent verification by a moderator, so can good behaviors. Good player behavior can be detected automatically through the machine learning model and/or be reported by another player. In some embodiments, the description of the good behavior and associated evidence is provided for verification to a moderator, which could be a person, a crowd-sourced review panel, and/or the machine learning model. Upon confirmation of the good behavior, the player responsible for the good behavior can be given a reward, such as a trophy or a reward within a particular game context or some other benefit. Also, in some embodiments, the receipt of the reward for confirmed good behavior is recorded in a behavior profile of the player.

As discussed above, in some embodiments, the machine learning model can be used to detect disruptive behavior by players within a given game context. However, in some embodiments, a player does not need to rely on the machine learning model to detect disruptive behavior, especially if the player is being victimized by the disruptive behavior. In these embodiments, the online gaming system 100 provides a mechanism through which a player can flag another player as having committed a possible disruptive behavior. When a player reports another player as being disruptive, the reporting player can give some contextual information to explain the possible disruptive behavior. Then, the online game system 100, by way of human moderator and/or machine learning model, can analyze the stored record of game play to determine if the possible disruptive behavior actually occurred. And, if the possible disruptive behavior actually occurred, the game system can save the stored record of game play relevant to the disruptive behavior as evidence to help the disruptive player learn not to be disruptive and/or to justify punitive action against the disruptive player.

Figure 2:
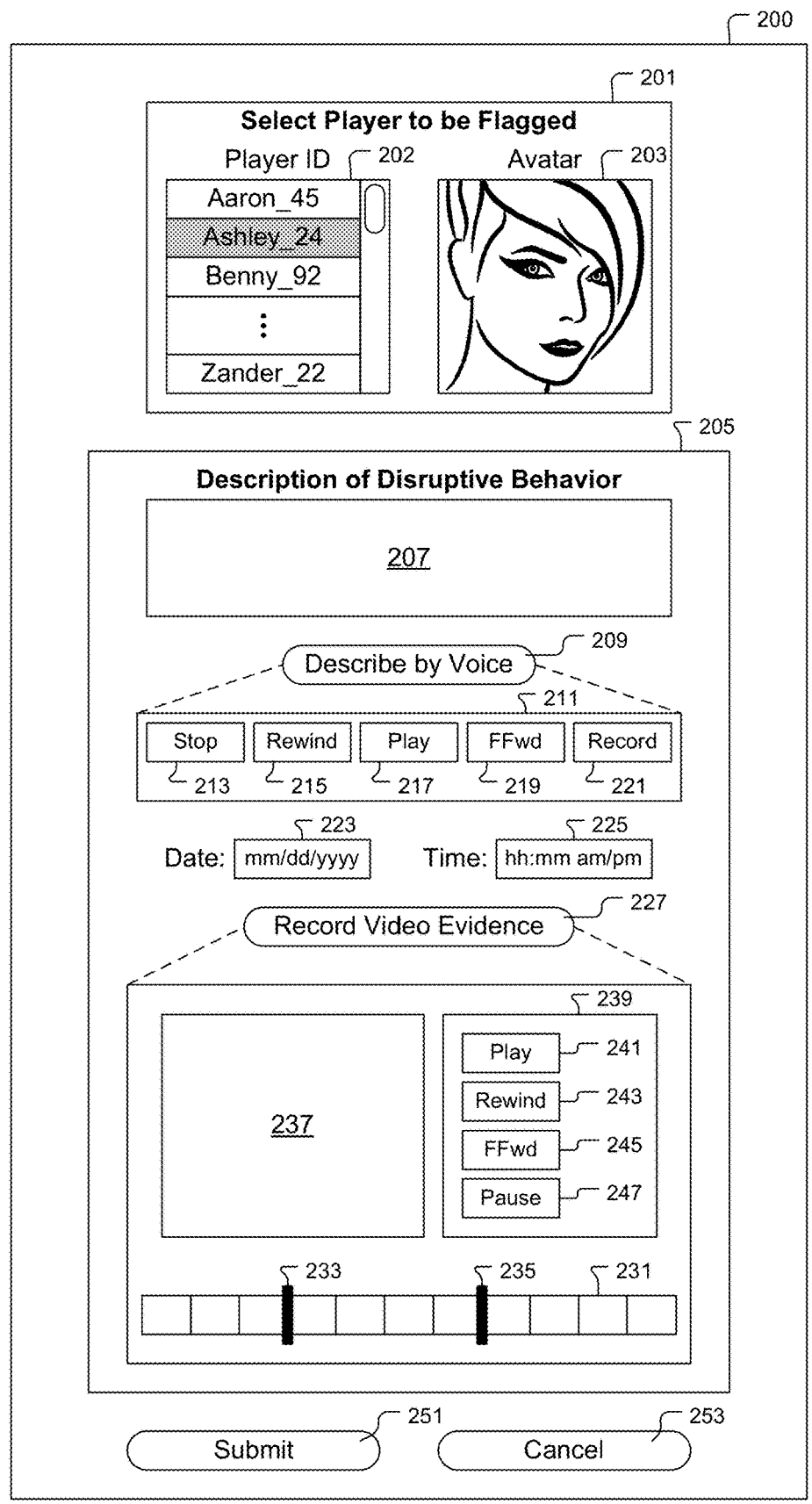
FIG. 2 shows an example graphical user interface (GUI) through which a reporting player can flag another player as having committed a possible disruptive behavior, in accordance with some embodiments.

FIG. 2 shows an example graphical user interface (GUI) 200 through which a reporting player can flag another player as having committed a possible disruptive behavior, in accordance with some embodiments. The GUI 200 provides a selection mechanism 201 through which the reporting player can select another player to be flagged. In some embodiments, the selection mechanism 201 provides a listing 202 of online identifiers for players active in the game at the time of the reporting, or within a specified time period prior to the reporting. In some embodiments, the specified time period can be up to 24 hours prior to the reporting. In some embodiments, the specified time period can be up to 12 hours prior to the reporting. In some embodiments, the specified time period can be up to 1 hour prior to the reporting. In other embodiments, the specified time period prior to the reporting can be set as needed to ensure that hit and run disruptive behavior is not permitted, where hit and run disruptive behavior refers to when a player commits a disruptive behavior and then abruptly leaves the game session to avoid being flagged by another player. In some embodiments, the reporting player is able to click-on or otherwise select the online identifier of the player to be flagged within the listing 202 of online identifiers for players active in the game at the time of the reporting. In some embodiments, the avatar or symbol of the selected player is shown in a region 203 of the selection mechanism 201. It should be understood that the selection mechanism 201 is provided by way of example. In other embodiments, the selection mechanism 201 can be essentially any type of selection mechanism that enables the reporting player to select a particular player to be flagged.

The GUI 200 also provides a data entry mechanism 205 through which the reporting player can provide a description of the possible disruptive behavior. In some embodiments, provision of a description of the possible disruptive behavior through the data entry mechanism 205 is required before the flagging can be completed and submitted to the online gaming system 100 for review. In some embodiments, the data entry mechanism 205 includes a text entry field 207 within which the reporting player can provide a written description of the possible disruptive behavior. In some embodiments, the data entry mechanism 205 provides an audio entry tool 209 that can be used to enter an audible description of the possible disruptive behavior. In some embodiments, selection of the auto entry tool 209 triggers display of audio recording controls 211, which include a stop button 213, a rewind button 215, a play button 217, a fast forward button 219, and a record button 221. In some embodiments, the data entry mechanism 205 includes a date field 223 and a time field 225 within which the date and time of the possible disruptive behavior can be entered by the reporting player.

Also, in some embodiments, the data entry mechanism 205 can include a video evidence selection tool 227. In some embodiments, selection of the video evidence selection tool 227 triggers display of video clip recording controls 229 than can be used to select a start time in the video stream of the player's game play and an end time in the video stream of the player's game play, where the selected start time and the selected end time bracket the possible disruptive behavior as shown in the video stream of the player's game play. In some embodiments, the video clip recording controls 229 includes a video stream ribbon 231 over which is shown a start time indicator 233 and an end time indicator 235. The video stream ribbon 231 shows the video stream of the player's game play for the current game session along a timeline. The video clip recording controls 229 can also include a playback window 237 in which the portion of the video stream bracketed by the start time indicator 233 and the end time indicator 235 can be reviewed by the reporting player before submission of the flagging report. Also, playback controls 239 are provided to control the playback of the portion of the video stream (as bracketed by the start time indicator 233 and the end time indicator 235) within the playback window 237. In some embodiments, the playback controls 239 include a play button 241, a rewind button 243, a fast forward button 245, and a pause button 247.

The GUI 200 also includes a submit button 251 and a cancel button 253. In some embodiments, the submit button 251 only becomes enabled when all required data has been entered within the GUI 200. Selection of the submit button 251 sends the flagging report to the online game system 100 for processing through moderation. In various embodiments, as discussed above, the moderation can be done by a person, by a crowd-sourced review panel, and/or by a machine learning model. The cancel button 253 cancels and closes the flagging report. In some embodiments, a confirmation control is displayed upon selection of the cancel button 253. In some embodiments, the confirmation control can include a yes button and no button for selection by the player to either confirm or cancel, respectively, the cancellation action initiated by selection of the cancel button 253.

In some embodiments, when the flagging report is submitted by the reporting player, the flagging report, or at least a link to the flagging report, is entered in the reporting player's behavior profile. Selection of the link to the flagging report from within the reporting player's behavior profile, or from wherever the link appears, triggers opening of the as-saved flagging report within the GUI 200. Also, after completion of the verification process by the moderator, the result of the verification process is reported to the reporting player. In some embodiments, the result of the verification process is recorded in the reporting player's behavior profile in conjunction with the corresponding flagging report.

In some embodiments, the online gaming system 100 is configured to and operated to track/monitor how much a player submits flagging reports against other players to ensure that the flagging process is not abused. In some embodiments, it can be determined that the flagging process is being abused by a player when a verification ratio of flagging reports falls below a threshold value, such as 0.5, where the verification ratio of flagging reports is defined as a number of flagging reports submitted by the player for verified disruptive behavior divided by a total number of flagging reports submitted by the player, where all flagging reports considered in computing the verification ratio of flagging reports have undergone a completed moderation process. In various embodiments, the threshold value for the verification ratio of flagging reports can be either less than or greater than 0.5, depending on the preferences of the online gaming system 100 provider/authority.

In some embodiments, if it is determined that the flagging system is being abused by a player, a weighting function or confidence value can be applied to the flagging reports submitted by the player. This weighting function or confidence value will convey to the moderator (which may be a person, a crowd-sourced review panel, and/or the machine learning model) to what degree the flagging reports submitted by the player should be scrutinized. In some embodiments, a higher value of the weighting function or confidence value can indicate to the moderator that a normal level of scrutiny should be applied in performing the verification process on the possible disruptive behavior as submitted in the flagging report by the player. In some embodiments, a lower value of the weighting function or confidence value can indicate to the moderator that a higher level of scrutiny should be applied in performing the verification process on the possible disruptive behavior as submitted in the flagging report by the player.

In some embodiments, as an alternative to using the GUI 200 for submitting a flagging report, a player can submit an audio-only flagging report by clicking a button (either on the controller or on the screen) or by saying a voice command, such as "Flag Player." Once the audio-only flagging report is initiated by the player, the player can provide an audio description of the possible disruptive behavior that occurred. The audio description can include the online ID of the possible disruptive player, and/or identification of a place in the game context where the possible disruptive behavior occurred, and/or a description of the possible disruptive behavior that occurred, among other types of information regarding the possible disruptive behavior. The online gaming system 100 is configured to and operated to process the audio-only flagging report to determine whether or not the possible disruptive behavior actually occurred. In some embodiments, along the same lines as previously discussed with regard to the moderation process, the processing of the audio-only flagging report is done automatically by the machine learning model searching through the saved game telemetry data, saved game video data, and/or any other saved game data to determine whether or not the reported possible disruptive behavior actually occurred. In some embodiments, the audio-only flagging report is processed by a person or by a crowd-sourced review panel. In these embodiments, the machine learning model can be used to gather evidence related to the possible disruptive behavior described in the audio-only flagging report. The gathered evidence is then provided to the human moderators for review.

It should be appreciated that the audio-only flagging report reduces friction in game play when compared to using the GUI 200 for submitting a flagging report. In some embodiments, the player submitting the audio-only flagging report can do so without pausing game play. However, the information in the audio-only flagging report may not be processed as accurately by the game system as the information provided through the GUI 200. But, the audio-only flagging report may include more descriptive information than what is typically provided by the player when typing in the descriptive information. Also, the audio-only flagging report includes information such as voice tone and voice level that can be processed to give the game system and machine learning model more information to work with in processing the audio-only flagging report. Also, in some embodiments, a variation of the audio-only flagging report can be used by a player to identify another player as having done a good behavior. A good behavior flagging report such as this can be submitted to a moderator for verification, where the moderator can be a person, a crowd-sourced review panel, and/or the machine learning model.

Sometimes, for whatever reason, a player may not feel comfortable submitting a flagging report against another player that has committed a possible disruptive behavior. Therefore, in some embodiments, a behavioral marking mechanism is provided through which a player can mark other players in the same game session as being disruptive, or good, or some level of behavior between disruptive and good. In these embodiments, the behavioral marking of a player is only visible to the player that makes the behavioral marking.

Figure 3A:
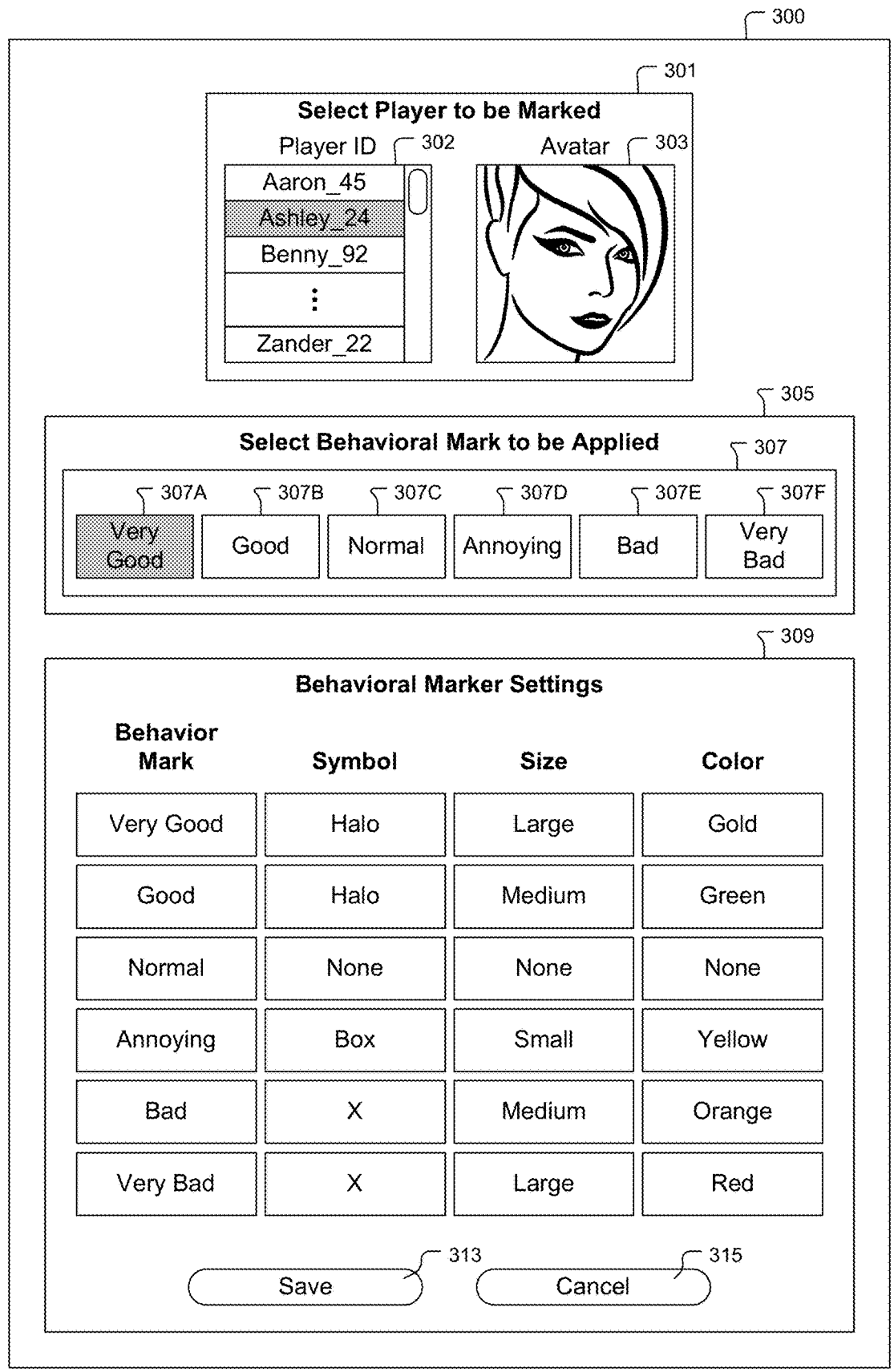
FIG. 3A shows a GUI through which a player can create a behavioral mark for another player, in accordance with some embodiments.

FIG. 3A shows a GUI 300 through which a player can create a behavioral mark for another player, in accordance with some embodiments. The GUI 300 provides a selection mechanism 301 through which the marking player can select another player to be behaviorally marked. In some embodiments, the selection mechanism 301 provides a listing 302 of online identifiers for players active in the game at the time of the marking, or within a specified time period prior to the marking. In some embodiments, the specified time period can be up to 24 hours prior to the marking. In some embodiments, the specified time period can be up to 12 hours prior to the marking. In some embodiments, the specified time period can be up to 1 hour prior to the marking. In other embodiments, the specified time period prior to the marking can be set as needed to ensure that a reasonable population of players relevant to the marking player's game play are presented for selection.

In some embodiments, the marking player is able to click-on or otherwise select the online identifier of the player to be behaviorally marked within the listing 302 of online identifiers for players. In some embodiments, the avatar or symbol of the selected player is shown in a region 303 of the selection mechanism 301. It should be understood that the selection mechanism 301 is provided by way of example. In other embodiments, the selection mechanism 301 can be essentially any type of selection mechanism that enables the reporting player to select a particular player to be behaviorally marked.

The GUI 300 also provides a marking control mechanism 305 through which the marking player can define a type of behavioral marking to be applied to the selected player as selected through the selection mechanism 301. In some embodiments, the marking control mechanism 305 includes a behavior descriptor selector 307 that includes a series of selectable controls 307A-307F to specify the behavioral description to be applied to the selected player as selected through the selection mechanism 301. For example, in some embodiments, the selectable controls 307A-307F are buttons for "Very Good," "Good," "Normal," "Annoying," "Bad," and "Very Bad," respectively, that when selected will apply that behavioral designation to the selected player as selected through the selection mechanism 301. In some embodiments, the GUI 300 provides a behavioral marker settings control 309 through which the player can set up a visual marking to be applied to the selected player for each of the behavioral designations in the behavior descriptor selector 307. For example, the behavioral marker settings control 309 can enable selection of a symbol and its characteristics (color, size, etc.) for each of the behavioral description selectable controls 307A-307F. For example, in the behavioral marker settings control 309, a "Large," "Gold," "Halo" symbol is applied to the "Very Good" behavioral description selectable control 307A. In some embodiments, selection of a symbol box, size box, or color box within the behavioral marker settings control 309 will trigger display of a corresponding menu of possible selections for the particular feature. The GUI 300 also includes a save button 313 and a cancel button 315. In some embodiments, the save button 313 only becomes enabled when all required data has been entered within the GUI 300. Selection of the save button 313 saves the behavioral marking data entered through the GUI 300 to the marking player's behavioral profile. The cancel button 315 cancels and closes the GUI 300. In some embodiments, a confirmation control is displayed upon selection of the cancel button 315. In some embodiments, the confirmation control can include a yes button and no button for selection by the player to either confirm or cancel, respectively, the cancellation action initiated by selection of the cancel button 315.

Figure 3B:
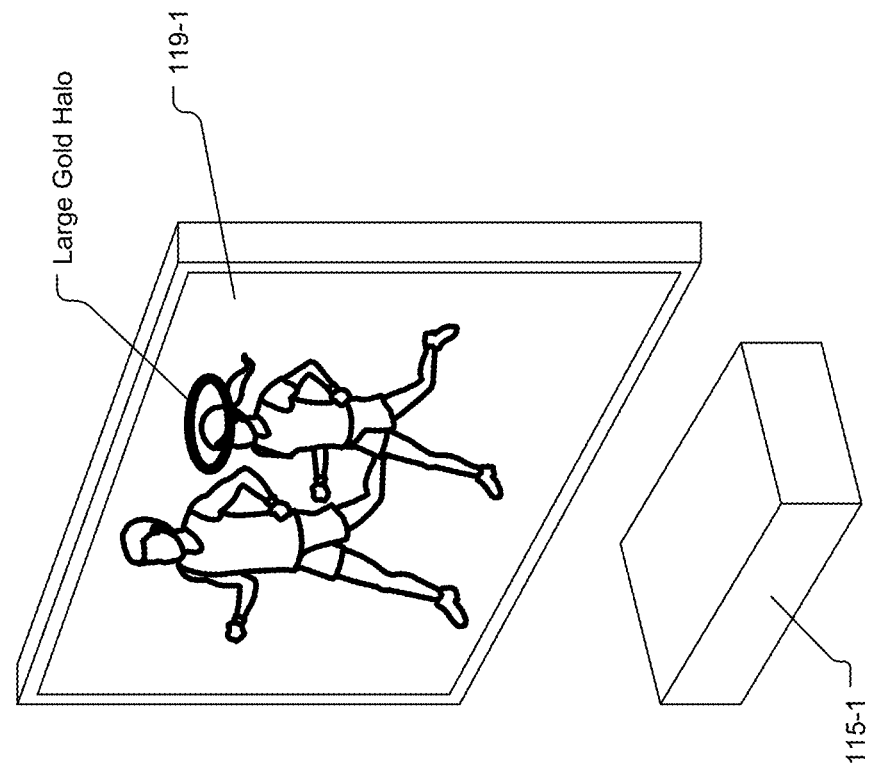
FIG. 3B shows how the behavioral marker applied to Joe in the example of FIG. 3A may appear in the game play view of the player that marked Joe as being "Very Good," in accordance with some embodiments.

When a player is selected by a marking player through the selection mechanism 301 for behavioral marking, the behavioral description associated with the selected control 307A-307F will be applied to the selected player, but only in the game play view of the marking player. In some embodiments, the behavioral description selected in the behavior descriptor selector 307 is applied to the behaviorally marked player in the game play view (of just the player that did the behavioral marking) by displaying the corresponding behavioral marker, as defined in the behavioral marker settings control 309, in conjunction with the avatar of the behaviorally marked player. FIG. 3B shows how the behavioral marker applied to Joe in the example of FIG. 3A may appear in the game play view of the player that marked Joe as being "Very Good," in accordance with some embodiments.

Figure 4A:
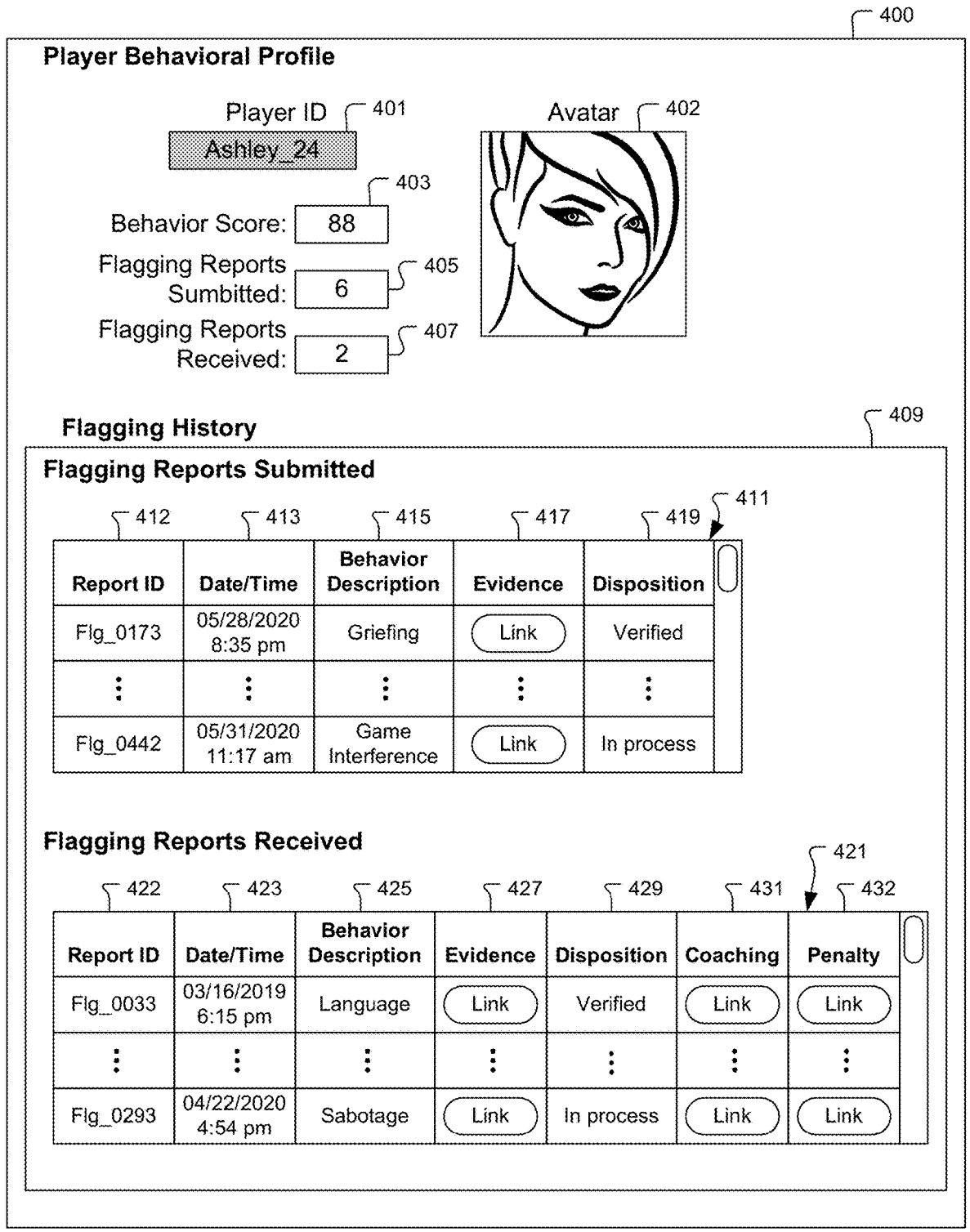

FIGS. 4A and 4B show an example of a player behavior profile 400, in accordance with some embodiments. FIG. 4B is a continuation of FIG. 4A to allow for complete description of the player behavior profile 400 content. In some embodiments, the player behavior profile 400 is configured to provide a dynamic gaming review for the player, showing both good and bad behaviors by the player, showing rewards received by the player, and providing suggestions for improving or rectifying verified disruptive behavior by the player. The player behavior profile 400 shows the player's online identifier 401, the player's avatar 402, the player's behavior score ($BS_{P\_M}$) 403, the number of flagging reports (such as described with regard to FIG. 2) submitted by the player 405, the number of flagging reports received by the player 407, and a flagging history 409 for the player. The flagging history 409 can show a listing 411 of flagging reports submitted by the player. Each flagging report in the listing 411 can include a report identifier 412, a date and time 413 of submittal of the flagging report, a description 415 of the disruptive behavior in the flagging report, a link 417 to evidence associated with the flagging report (such as a video clip, a chat stream, etc.), and a disposition 419 of the flagging report. In some embodiments, the disposition 419 can indicate either "Verified," "Unverified," or "Under Review."

In some embodiments, the flagging history 409 shows a listing 421 of flagging reports received by (submitted against) the player. Each flagging report in the listing 421 can include a report identifier 422, a date and time 423 of submittal of the flagging report, a description 425 of the disruptive behavior in the flagging report, a link 427 to evidence associated with the flagging report (such as a video clip, a chat stream, etc.), and a disposition 429 of the flagging report. In some embodiments, the disposition 429 can indicate either "Verified," "Unverified," or "Under Review." In some embodiments, if the disposition 429 indicates "Verified," the flagging report can include a coaching link 431 that when selected triggers display of information providing a description of how to avoid recommitting the verified disruptive behavior. For example, if a verified disruptive behavior is that the player does not pick up a particular game asset when they have the opportunity. Selection of the coaching link 431 can trigger display of an assistance message that explains and/or demonstrates to the player how to pick up the particular game asset when they have the opportunity. In this manner, the player behavior profile 400 can become a "dynamic gaming coach." Also, in some embodiments, if the disposition 429 indicates "Verified," the flagging report can include a penalty link 432 that when selected triggers display of information describing the penalty applied to the player for the disruptive behavior and how much of the penalty remains to be paid. For example, if the penalty is time-based, the description of the penalty will specify how much penalty time remains to be paid.

Also, in some embodiments, the player behavior profile 400 can include a listing 433 of rewards and/or accolades received by the player for good behavior. In some embodiments, each reward in the listing 433 of rewards can include a reward identifier 434, a date and time 435 of the reward, a description 437 of the good behavior associated with reward, a link 439 to evidence associated with the reward (such as a video clip, a chat stream, etc.), and an image of or link 441 to the reward. The issuance of rewards to a player and the listing 433 of the rewards in the player behavior profile 400 can be used by the online gaming system 100 to incentivize good player behavior. In various embodiments, a reward can be essentially anything of value to the player in the gaming world, such as a trophy, an accolade, a token for in-game credit that can be redeemed for in-game assets, etc.

In some embodiments, the player behavior profile 400 provides a behavior preferences specification mechanism 451 that enables the player to select disruptive behaviors that are to be avoided during game play, if possible. In some embodiments, the behavior preferences specification mechanism 451 provides listing of possible disruptive behaviors 452 and associated check boxes 453 that can be selected or unselected by the player as disruptive behavior to be avoided. Through the behavior preferences specification mechanism 451, the player can set preferences for what types of disruptive behavior are more or less bothersome. In some embodiments, these preferences are used by the online gaming system 100 to sort or rank game sessions (game rooms) for the player based on the real-time player behavior demographics in the various game sessions. Also, in some embodiments, the selections made by a given player in the behavior preferences specification mechanism 451 can be used by the machine learning model to determine which players in the game session are disruptors relative to the given player. Then, the player(s) in the game session that are determined to be disruptors relative to the given player can be identified as disruptors to the given player in a customized manner. In some embodiments, players are identified as disruptors just to a particular player in accordance with the behavioral preferences of the particular player and the flagging history of the players in the online gaming system 100. In some embodiments, players are identified as disruptors on a global level, and can be identified as disruptive players to all other players. In some embodiments, the machine learning model operates to suggest selections in the behavior preferences specification mechanism 451 for a given player based on the given player's game play and/or flagging history.

Also, in some embodiments, the player behavior profile 400 includes a disruptive behavior tolerance setting 461 that can be set by the player to indicate on a relative scale how much disruptive behavior they are willing to tolerate in a game session. In some embodiments, the disruptive behavior tolerance setting 461 is a number on a scale of 0 to 10, where 0 indicates that the player is not will to tolerate any disruptive behavior by other players, and where 10 indicates that the player is willing to tolerate all disruptive behavior by other players. In some embodiments, the disruptive behavior tolerance setting 461 is used by the game system to select a game session in which to place the player based on real-time disruptive behavior demographics of the game session. The disruptive behavior tolerance setting 461 allows the player to select a level of aggressiveness at which they prefer to play, where increased aggressiveness corresponds to increased, but tolerated, disruptive behavior.

Also, in some embodiments, the player behavior profile 400 provides a marked player listing 471 that lists all of the players that have been behaviorally marked by the player, such as described with regard to FIGS. 3A and 3B. Each entry in the marked player listing 471 includes the online identifier 473 of the behaviorally marked player, the behavior description 475 of the behaviorally marked player (such as "Very Good," "Good," "Normal," "Annoying," "Bad," and "Very Bad"), an edit control 477, and a delete control 479. Selection of the edit control 477 for a given entry in the marked player listing 471 brings up the GUI 300 described with respect to FIG. 3A, through which the settings of the behavioral marking for the given entry can be changed. The delete control 470 for a given entry in the marked player listing 471 deletes the behavioral marking corresponding to the given entry. It should be understood that the behavioral profile 400 is shown by way of example. In various embodiments, the behavioral profile 400 can include more or less data that what is described herein. Also, the appearance, organization, content, and operability of the behavioral profile 400 can vary in different embodiments.

In some embodiments, the game system will have multiple instances of a given game underway in separate game sessions. Each game session is akin to a separate game room. The players in one game room share and play in the same game context. Normally, players in different game rooms are not aware of each other's presence or game play. In some embodiments, players can enter and leave a game room as desired. Therefore, player behavioral demographics within a game room can vary over time as players enter and leave the game room. In some embodiments, a player is automatically placed in a game room by the online gaming system 100. In some embodiments, the automatic placement of players into game rooms can be done in a manner to optimize game play experience and/or balance game server 101 loading and/or achieve some other objective within the online gaming system 100. In some embodiments, the machine learning model is used to determine the game room in which a player is placed. In some embodiments, the machine learning model uses the behavior preferences specified in the player's behavioral profile 400 to determine a particular game room that has current behavioral demographics best suited to the player and recommends that particular game room to the online gaming system 100 for placement of the player.

In some embodiments, the player is allowed to select the game room in which they prefer to play from a listing of available game rooms. In these embodiments, the player is presented with a listing of available game rooms and the behavioral demographics of each available game room. In some embodiments, the machine learning model is used to sort the available game rooms for presentation to the player based on the behavior preferences specified in the player's behavioral profile 400 and the current behavioral demographics within each of the available game rooms. In some embodiments, each game room has a room behavioral profile that specifies the current, real-time, behavioral demographics within the game room. In some embodiments, the current, real-time, behavioral demographics of each game room is continuously computed and updated by the machine learning model.

In some embodiments, the behavioral demographics of a given game room includes data on how many disruptive players are currently present in the given game room and the level (severity level) of disruptive behavior associated with the disruptive players. In some embodiments, the behavioral demographics of a given game room includes information on the types of verified disruptive behavior that have been committed by players currently in the given game room. In some embodiments, the behavioral demographics of a given game room includes data on how many non-disruptive players (good players) are currently present in the given game room. In some embodiments, the behavioral demographics of a given game room includes data specifying a probability of encountering disruptive behavior in the given game room. In some embodiments, the behavioral demographics of a given game room includes data specifying a current density of disruptive players in the given game room, such as one disruptive player per one hundred players in the game room.

In some embodiments, a room behavioral status indicator is provided for each game room. The room behavioral status indicator is defined to indicate at a glance the overall behavioral demographics within the game room at the current time, based on consideration of the player's behavior preferences as specified in the player's behavioral profile 400. It should be understood that the room behavioral status indicator for a given game room can appear differently to different players in the given game room at the same point in time because of the different players' behavior preferences as specified in the players' behavioral profile 400.

Figure 5A:
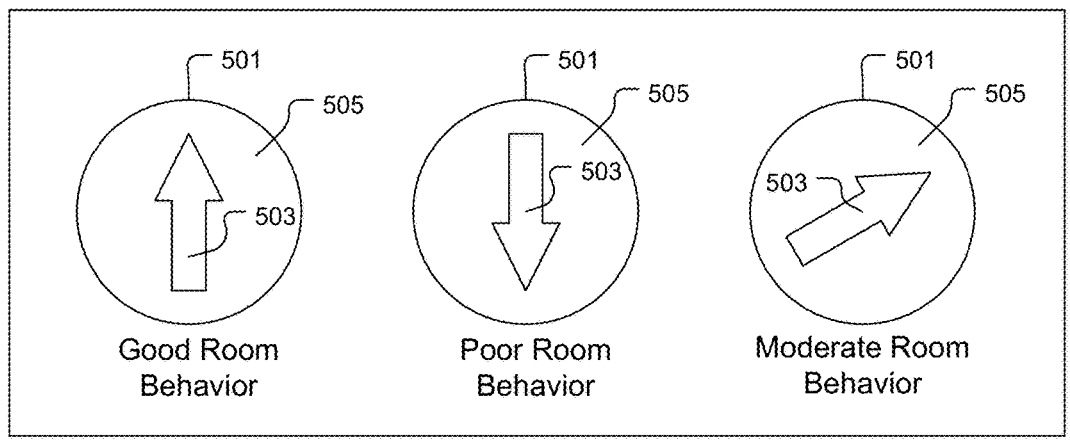
FIG. 5A shows an example of a room behavioral status indicator for a given player, in accordance with some embodiments.

FIG. 5A shows an example of a room behavioral status indicator 501 for a given player, in accordance with some embodiments. The room behavioral status indicator 501 includes an arrow 503 that points upward when the room behavioral demographics are favorable for the given player, and that points downward when the room behavioral demographics are unfavorable for the given player. In some embodiments, the arrow 503 can point in a direction between upward and downward to indicate transition of the room behavioral demographics between good and bad. Also, in some embodiments, a color of the arrow 503 and/or a color of a background 505 behind the arrow can change as the arrow moves to indicate the current, real-time, status of the room behavioral demographics. For example, the background 505 of the arrow 503 may turn green when the arrow is pointed upward, may turn yellow with the arrow 503 is pointed sideways, and may turn red when the arrow 503 is pointed downward, or some variation thereof.

In some embodiments, the room behavioral status indicator of a given room as shown to a given player reflects a current value of a computed behavioral parameter across the players currently within the game room. For example, if the number of players currently in the game room that are considered disruptive players to the given player exceeds fifty percent of the total number players currently in the game room, the room behavioral status indicator will reflect a poor condition of the current behavioral demographics within the room, and otherwise, the room behavioral status indicator will reflect an acceptable condition of the current behavioral demographics within the room.

Figure 5B:
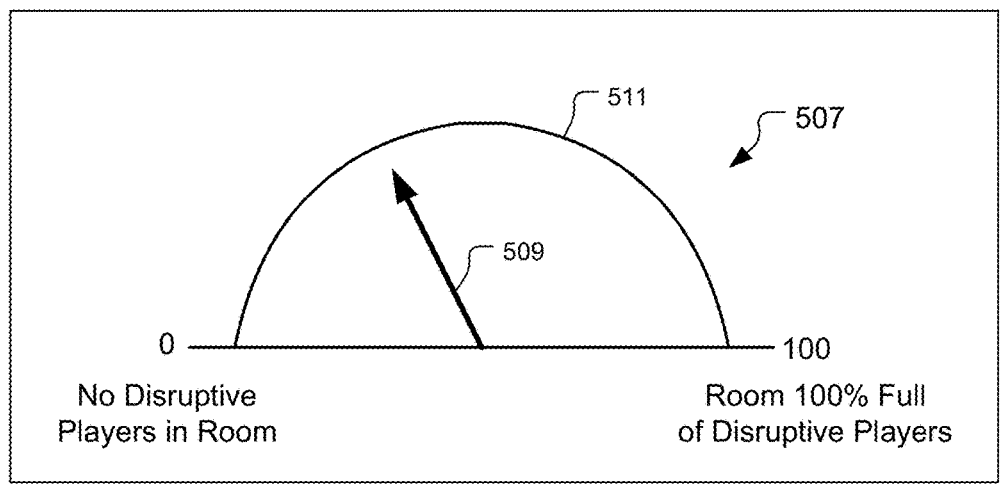
FIG. 5B shows an example of a room behavioral status indicator that includes an arrow pointing in a direction on a scale of 0 to 100, where the direction in which the arrow points on the scale corresponds to the percentage of the total number of players currently in the game room that are considered to be disruptive players to a given player, in accordance with some embodiments.
Figures 5C, 5D, 5E:
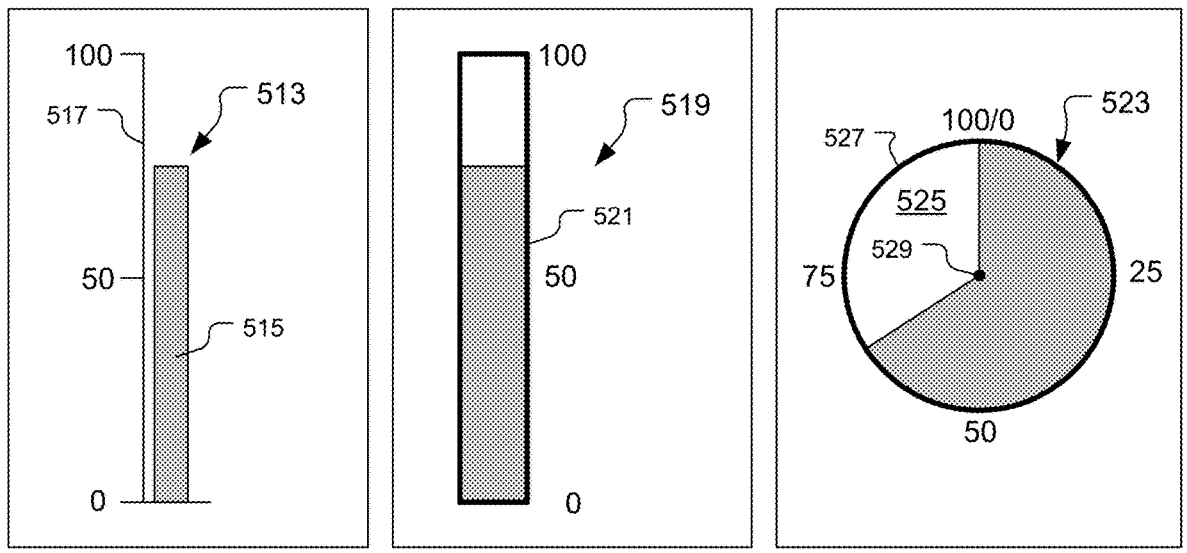
FIG. 5C shows an example of a room behavioral status indicator that includes a bar with an adjacent scale of 0 to 100, where a length of the bar along the scale corresponds to the percentage of the total number of players currently in the game room that are considered to be disruptive players to a given player, in accordance with some embodiments.
FIG. 5D shows an example of a room behavioral status indicator that includes a rectangle, where an amount of fill of the rectangle corresponds to the percentage of the total number of players currently in the game room that are considered to be disruptive players to a given player, in accordance with some embodiments.
FIG. 5E shows an example of a room behavioral status indicator that includes a circle having a perimeter representing a scale from 0 to 100, where an azimuthal fill of the circle about a centerpoint of the circle corresponds to the percentage of the total number of players currently in the game room that are considered to be disruptive players to the given player, in accordance with some embodiments.

In some embodiments, the room behavioral status indicator as shown to a given player is depicted as a percentage of the total number of players currently in the game room that are considered to be disruptive players to the given player. FIG. 5B shows an example of a room behavioral status indicator 507 that includes an arrow 509 pointing in a direction on a scale 511 of 0 to 100, where the direction in which the arrow 509 points on the scale 511 corresponds to the percentage of the total number of players currently in the game room that are considered to be disruptive players to the given player, in accordance with some embodiments. FIG. 5C shows an example of a room behavioral status indicator 513 that includes a bar 515 with an adjacent scale 517 of 0 to 100, where a length of the bar 515 along the scale 517 corresponds to the percentage of the total number of players currently in the game room that are considered to be disruptive players to the given player, in accordance with some embodiments. FIG. 5D shows an example of a room behavioral status indicator 519 that includes a rectangle 521, where an amount of fill of the rectangle 521 corresponds to the percentage of the total number of players currently in the game room that are considered to be disruptive players to the given player, in accordance with some embodiments. FIG. 5E shows an example of a room behavioral status indicator 523 that includes a circle 525 having a perimeter 527 representing a scale from 0 to 100, where an azimuthal fill of the circle 525 about a centerpoint 529 of the circle 525 corresponds to the percentage of the total number of players currently in the game room that are considered to be disruptive players to the given player, in accordance with some embodiments. It should be understood that there are many other ways in which the room behavioral status indicator can be graphically represented.

Also, in some embodiments a current state of the room behavioral status indicator can reflect the average of the behavior scores ($BS_{P\_Avg}$) of the players currently within the game room. Because the average of the behavior scores ($BS_{P\_Avg}$) of the players currently within the game room exists within a range extending from 0 to 100, the various graphical techniques mentioned above with regard to FIGS. 5A-5E, or other graphical techniques, can also be used to graphically represent the room behavioral status indicator when computed based on the average of the behavior scores ($BS_{P\_Avg}$) of the players currently within the game room. In some embodiments, the room behavioral status indicator can be used by the online gaming system 100 to warn or advise the player when the behavioral demographics of the game room have become incompatible with the preferred behavior preferences specified in the player's behavioral profile 400 and/or have become potentially problematic for the player.

FIG. 6A shows a GUI 600 for enabling behavior-based game room selection by a player, in accordance with some embodiments. The GUI 600 shows a listing 601 of the game rooms currently available for selection by the player seeking to play Game X. Each game room in listing 601 includes an identifier 603 of the game room, a summary 605 of current behavioral demographics within the game room, a behavioral status indicator 607 indicating the current behavioral demographics within the game room, and a link 609 to a minimap showing the behavioral status of players currently within the game room at their respective locations within the game space of the game room. In some embodiments, the summary 605 of current behavioral demographics within the game room includes a number of verified disruptive players currently within the game room 611, a total number of players currently in the game room 613, a current probability of encountering a disruptive player in the game room 615, a current density of disruptive players in the game room 617, an average behavior score ($BS_{P\_At}$) for players currently within the game room 619, and a link 621 that when selected displays a listing of verified disruptive behaviors associated with the players currently within the game room. In some embodiments, the verified disruptive behaviors in the listing are sorted by frequency of occurrence.

Figure 6B:
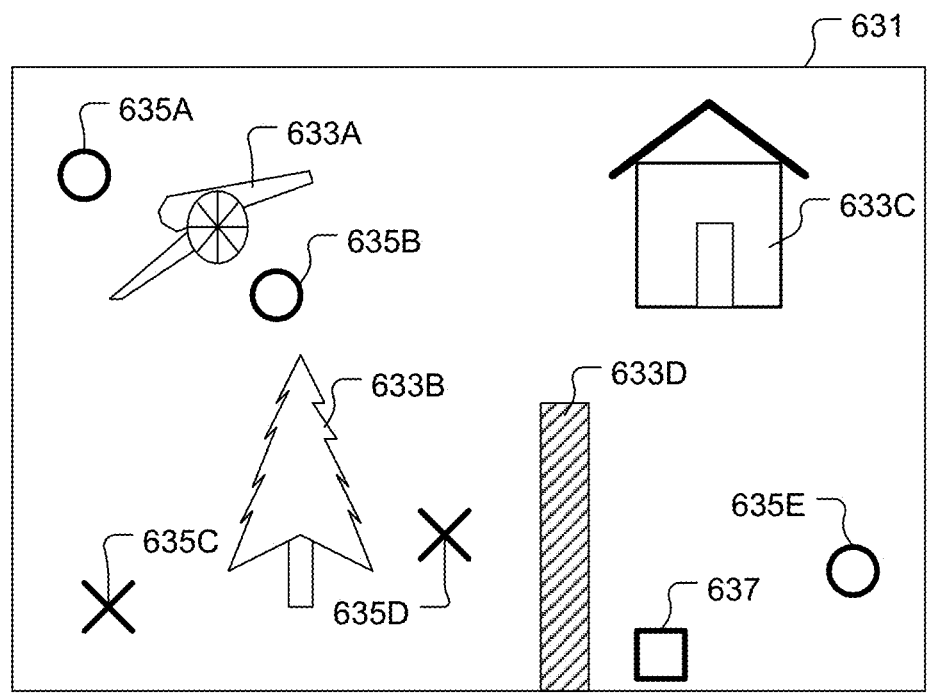
FIG. 6B shows an example of a minimap that is displayed upon selection of the link to the minimap for a game room entry in the listing of the game rooms, in accordance with some embodiments.

FIG. 6B shows an example of a minimap 631 that is displayed upon selection of the link 609 to the minimap for a game room entry in the listing 601 of the game rooms, in accordance with some embodiments. In some embodiments, the minimap 631 shows an aerial view of a region within the game space within the game room. In some embodiments, the minimap includes symbols 633A-633D representing various features within the game space and includes symbols 635A-635E representing various players in the game space at their respective locations within the game space. Also, in some embodiments, the minimap 631 shows a location 637 where the player would enter the game space if they chose the corresponding game room for game play. In some embodiments, the symbols 635A-635E representing the various players in the game space are defined to convey behavioral information about the player, such as whether or not the player is a disruptive player. For example, in the minimap 631, the "X" symbol is used to represent disruptive players within the game space, and the "O" symbol is used to represent non-disruptive players within the game space. It should be understood that the minimap 631 is a very simple representation for ease of description. In various embodiments, the minimap 631 can include an extensive and detailed specification of game features and/or game assets at their respective locations within the game space. Also, in various embodiments, the minimap 631 can include detailed representations of players and their associated behavioral descriptions, at their respective locations within the game space.

Figure 7A:
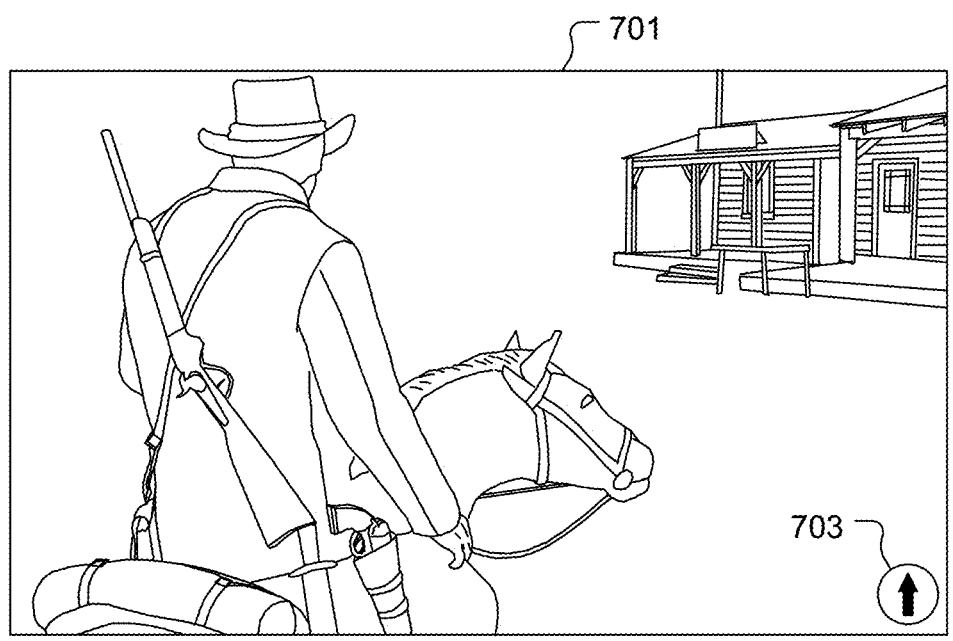
FIG. 7A shows an example of a player's display within a game room, in accordance with some embodiments.
Figure 7B:
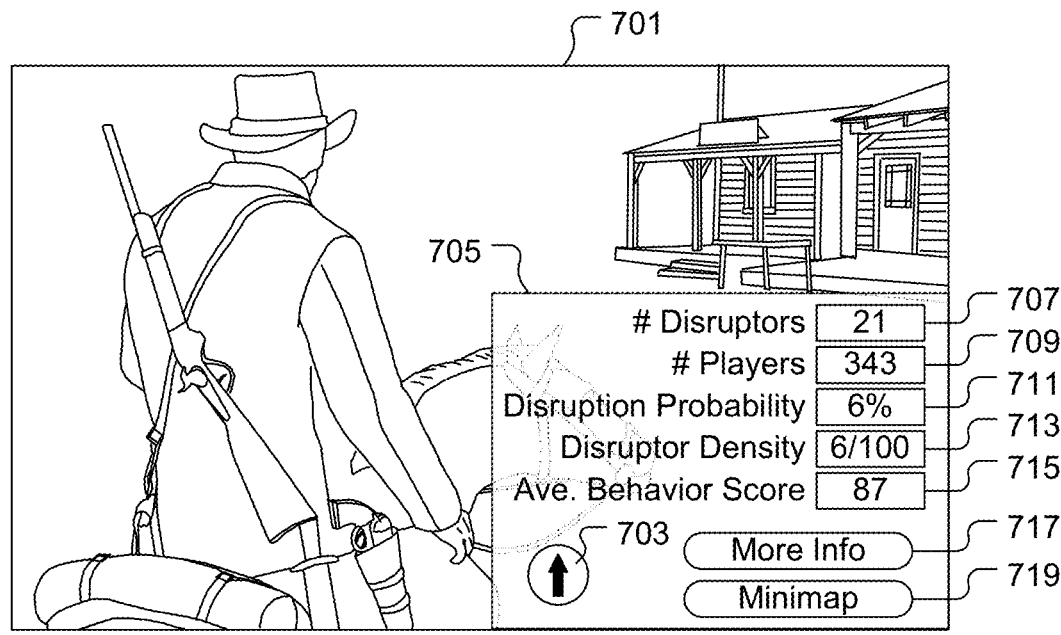
FIG. 7B shows the behavioral status HUD present within a region of the player's display, in accordance with some embodiments.

Once a player selects a game room in which to play or is placed in a game room automatically by the online gaming system 100, the player may wish to monitor or at least periodically review the current behavioral demographics within the game room. In some embodiments, the player is provided with a mechanism to trigger display of a GUI that shows the current behavioral demographics of the game room. In some embodiments, the GUI can be shown as a heads-up display (HUD) to minimize friction/interference with the player's current game play. FIG. 7A shows an example of a player's display 701 within a game room, in accordance with some embodiments. In some embodiments, a room behavioral status indicator 703 is continuously shown in the player's display 701. In some embodiments, selection of the room behavioral status indicator 703 triggers display of a behavioral status HUD 705. In some embodiments, the behavioral status HUD 705 is displayed in response to a voice command or other input provided by the player. FIG. 7B shows the behavioral status HUD 705 present within a region of the player's display 701, in accordance with some embodiments. The behavioral status HUD 705 shows current behavioral demographics within the game room. In some embodiments, the behavioral status HUD 705 is shown in a region of the player's display 701 that will minimize interference with the player's game play. In some embodiments, the behavioral status HUD 705 shows the room behavioral status indicator 703, a number of disruptive players currently in the game room 707, a total number of players currently in the game room 709, a probability of encountering a disruptive player in the game room 711, a density of disruptive players in the game room 713, and an average behavioral score ($BS_{P\_Avg}$) of players currently within the game room 715. In some embodiments, a control 717 is provided in the behavioral status HUD 705 to bring up more details about the current behavioral demographics within the game room. In some embodiments, selection of the control 717 triggers opening of the GUI 600, as described with regard to FIG. 6A, for behavior-based game room selection by the player. The player can navigate within the GUI 600 to obtain more detailed information about the current behavioral demographics within the currently selected game room or select a different game room to enter for play.

Figure 7C:
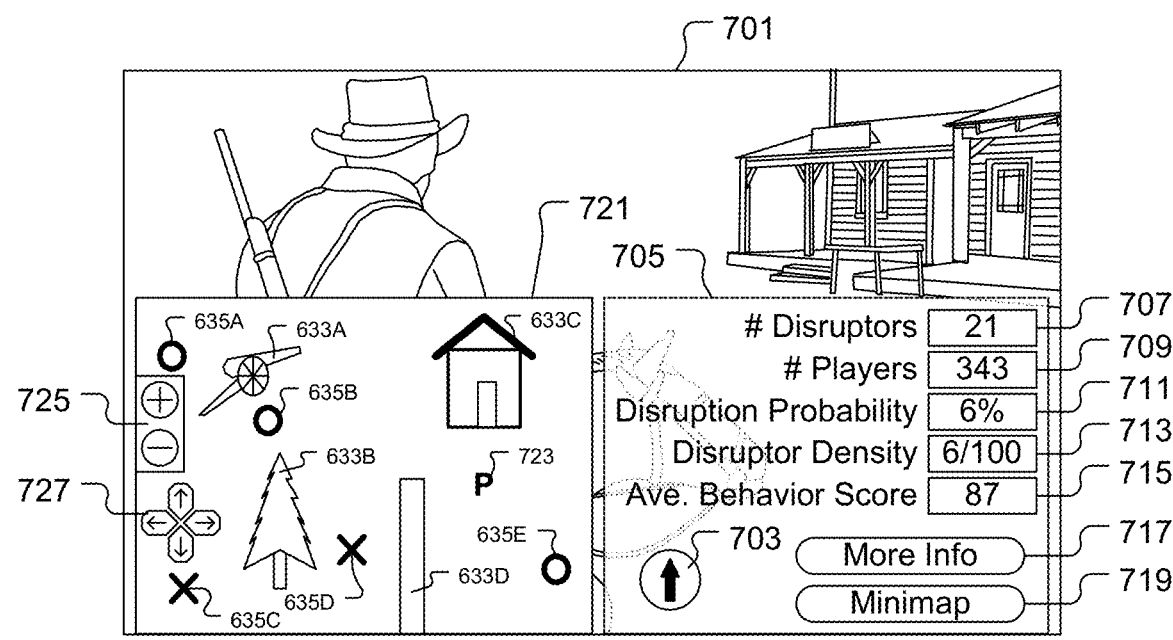
FIG. 7C shows an example of the behavioral minimap, in accordance with some embodiments.

In some embodiments, the behavioral status HUD 705 includes a control 719 for surfacing/showing a behavioral minimap 721 of the game space around the player within the game room. FIG. 7C shows an example of the behavioral minimap 721, in accordance with some embodiments. In some embodiments, the behavioral minimap 721 shown in response to selection of the control 719 is like the minimap 631 shown in FIG. 6B, with the exception that a current position 723 of the player "P" in the game space is shown. In some embodiments, the behavioral minimap 721 is shown addition to the behavioral status HUD 705. In some embodiments, selection of the control 719 triggers removal of the behavior status HUD 705 from the player's display 701 in conjunction with showing of the behavioral minimap 721 within the player's display 701.

In various embodiments, the symbols/avatars of the players in the game space can be depicted in the behavioral minimap 721 in many different ways to convey different types of behavioral information about the players in the game space. For example, the symbols/avatars of various players in the behavioral minimap 721 can be color-coded, where different colors represent different behavioral characteristics of the various players. For example, a symbol/avatar of a verified disruptive player in the behavioral minimap 721 can be colored red or be given a red halo, or some other color and graphic that indicates the verified disruptive player characteristic. Similarly, a symbol/avatar of a good (non-disruptive) player in the behavioral minimap 721 can be colored green or be given a green halo, or some other color and graphic that indicates the good (non-disruptive) player characteristic. In some embodiments, a size and/or shape of the symbol/avatar of a player within the behavioral minimap 721 can be adjusted to reflect a relative amount of behavioral badness or behavioral goodness of the player. Also, in some embodiments, the behavioral minimap 721 includes a textual description of the behavioral characteristics of players in the game space, such as "good," "bad," "ok," etc. In some embodiments, the behavioral minimap 721 provides a zoom control 725 for zooming into and out of the game space. In some embodiments, the behavioral minimap 721 provides for navigation of the minimap view within the game space. For example, in some embodiments, the user can click and drag on the behavioral minimap 721 to navigate a view of the behavioral minimap 721 within the game space. In some embodiments, the behavioral minimap 721 includes arrow controls 727 for navigation of the view of the behavioral minimap 721 within the game space.

It should be appreciated that the behavioral minimap 721 provides the player with a snapshot view of their proximity to other players in the game space and what the behavioral characteristics are of the other players in the game space. In this manner, the behavioral minimap 721 can be used by the player to navigate away from and/or avoid encountering disruptive players within the game space. Also, the behavioral minimap 721 can be used by the player to prepare themselves for an encounter with a potentially disruptive player and thereby avoid or mitigate any attempted disruptive behavior. It should be understood that because the behavioral minimap 721 for display to a given player is based on the behavioral preference settings in the given player's behavioral profile 400, different behavioral minimaps 721 for different players can show differences with regard to which player are considered behaviorally "good" or "bad" and to what degree.

Figure 8:
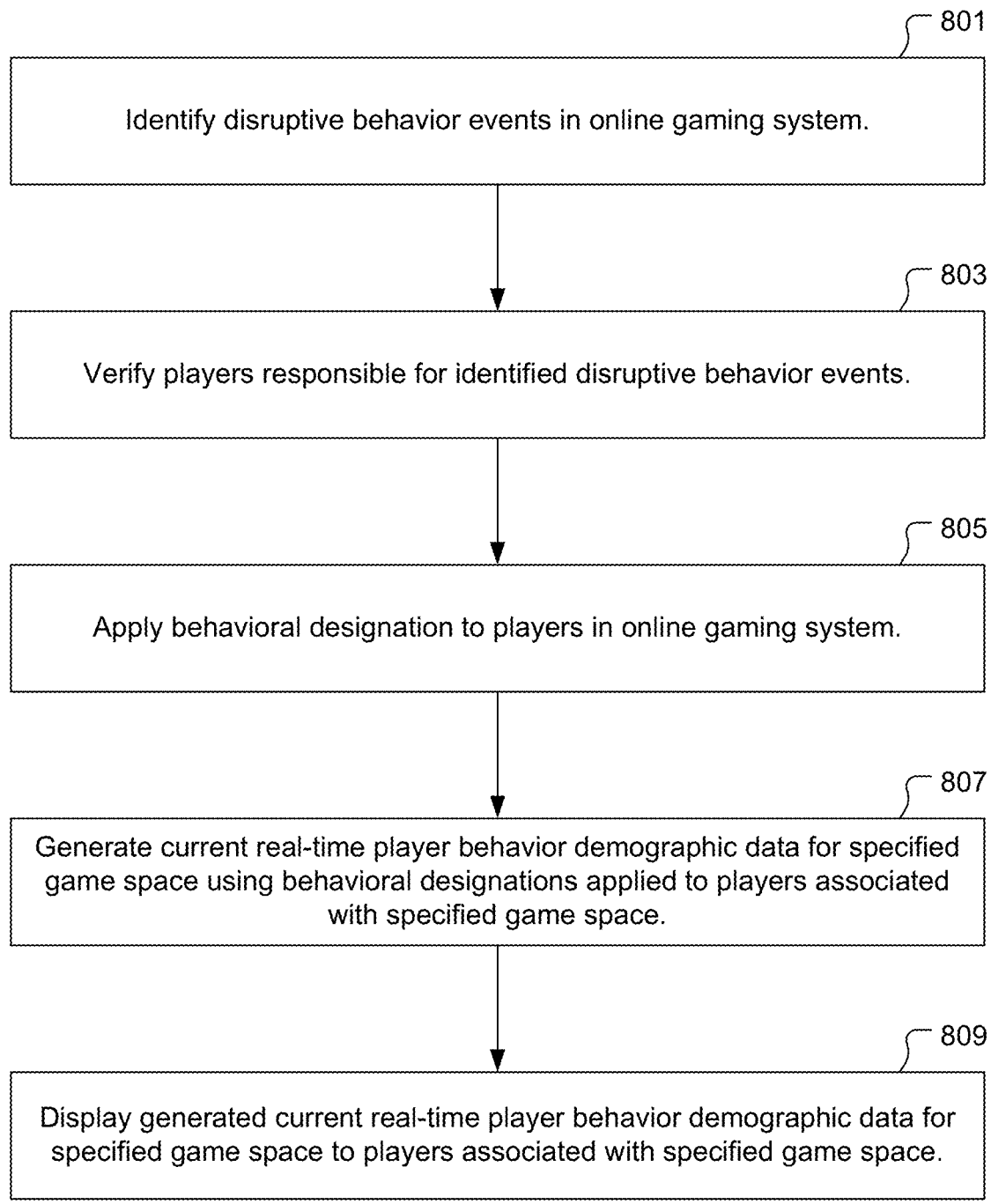
FIG. 8 shows a flowchart of method for processing disruptive behavior within an online gaming system, in accordance with some embodiments.

FIG. 8 shows a flowchart of method for processing disruptive behavior within an online gaming system, in accordance with some embodiments. The method includes an operation 801 for identifying disruptive behavior events within the online gaming system. In some embodiments, identifying disruptive behavior events within the online gaming system includes executing a machine learning model to process data associated with operation of the online gaming system. In some embodiments, the data processed by the machine learning model includes game telemetry data, user data, video data, chat data, and text data, and possibly other types of data. In some embodiments, identifying disruptive behavior events within the online gaming system includes processing a disruptive behavior flagging report submitted by a player. The disruptive behavior flagging report includes a description of a possible disruptive behavior, an identifier of a player responsible for the possible disruptive behavior, and evidence related to the possible disruptive behavior. In some embodiments, the evidence includes one or more of video data, chat data, and text data, and possibly other types of evidence.

The method also includes an operation 803 for verifying players responsible for the identified disruptive behavior events. In some embodiments, verifying players responsible for the identified disruptive behavior events includes performing a verification process to determine whether or not evidence exists to confirm an occurrence of a given identified disruptive behavior and one or more player responsible for the given identified disruptive behavior. In some embodiments, the verification process is performed by one or more of a person, a crowd-sourced review panel, and a machine learning model.

The method also includes an operation 805 for applying a behavioral designation to players in the online gaming system. The behavioral designation indicating whether or not a player is verified as responsible for one or more of the identified disruptive behavior events. In some embodiments, applying the behavioral designation to players in the online gaming system includes applying a disruptor graphic to a designator of a player verified to have committed a given disruptive behavior event within the online gaming system. In some embodiments, the designator of the player is an avatar of the player or a symbol representing the player. In some embodiments, the disruptor graphic is visible in the online gaming system to players for which the given disruptive behavior event constitutes an unacceptable disruptive behavior. In some embodiments, the disruptor graphic is not visible in the online gaming system to players for which the given disruptive behavior event does not constitute an unacceptable disruptive behavior. In some embodiments, the disruptor graphic conveys a severity level of the given disruptive behavior event. For example, in some embodiments, a size, a shape, a color and/or a position/placement of the disruptive behavior event can be defined to convey the severity level of the given disruptive behavior event. In some embodiments, the given disruptive behavior event constitutes a globally unacceptable disruptive behavior within the online gaming system, and the disruptor graphic is visible to all players in the online gaming system. In some embodiments, the method also includes generating a minimap for a game space that shows designators of players at their respective locations within the game space. In these embodiments, each designator shown in the minimap for any player verified to have committed some disruptive behavior event within the online gaming system has a corresponding disruptor graphic applied within the minimap.

The method also including an operation 807 for generating current real-time player behavior demographic data for a specified game space using the behavioral designations applied to players associated with the specified game space. In some embodiments, the current real-time player behavior demographic data for the specified game space includes a number of disruptive players currently within the specified game space. In some embodiments, the current real-time player behavior demographic data for the specified game space includes an average behavior score for players currently within the specified game space. In some embodiments, the current real-time player behavior demographic data for the specified game space includes a density of disruptive players currently within the specified game space. In some embodiments, the current real-time player behavior demographic data for the specified game space includes a current probability encountering a disruptive player within the specified game space. In some embodiments, the current real-time player behavior demographic data for the specified game space includes a room-level behavioral status indicator for the specified game space.

The method also includes and operation 809 for displaying the generated current real-time player behavior demographic data for the specified game space to players associated with the specified game space. In some embodiments, the current real-time player behavior demographic data for the specified game space is shown within a heads-up display within game video transmitted to players associated with the specified game space. In some embodiments, the current real-time player behavior demographic data for the specified game space is shown by displaying a current status of the room-level behavioral status indicator for the specified game space at a location within game video transmitted to players associated with the specified game space.

In some embodiments, the method also includes generating a behavior profile for a given player. The behavior profile includes a behavior history of the given player within the online game system. In some embodiments, the behavior history of the given player includes a listing of verified disruptive behavior events committed by the given player within the online gaming system. In some embodiments, the behavior history of the given player includes a listing of verified good behavior events performed by the given player within the online gaming system. In some embodiments, the behavior profile includes behavior preferences of the given player within the online game system. In some embodiments, the behavior preferences of the given player specifies one or more types of disruptive behavior within the online gaming system that is/are unacceptable to the given player. In some embodiments, the behavior preferences of the given player specifies a disruptive behavior tolerance level for the given player within the online gaming system. In some embodiments, the behavior profile includes a behavior score for the given player within the online game system.

In some embodiments, an online gaming system is configured to implement the method of FIG. 8, including any optional and/or ancillary operations associated with the method of FIG. 8. In some embodiments, the online gaming system includes a computer memory that includes computer executable program instructions for processing disruptive behavior within the online gaming system. The computer executable program instructions include program instructions for performing the operations of the method of FIG. 8, including any optional and/or ancillary operations associated with the method of FIG. 8.

Figure 9:
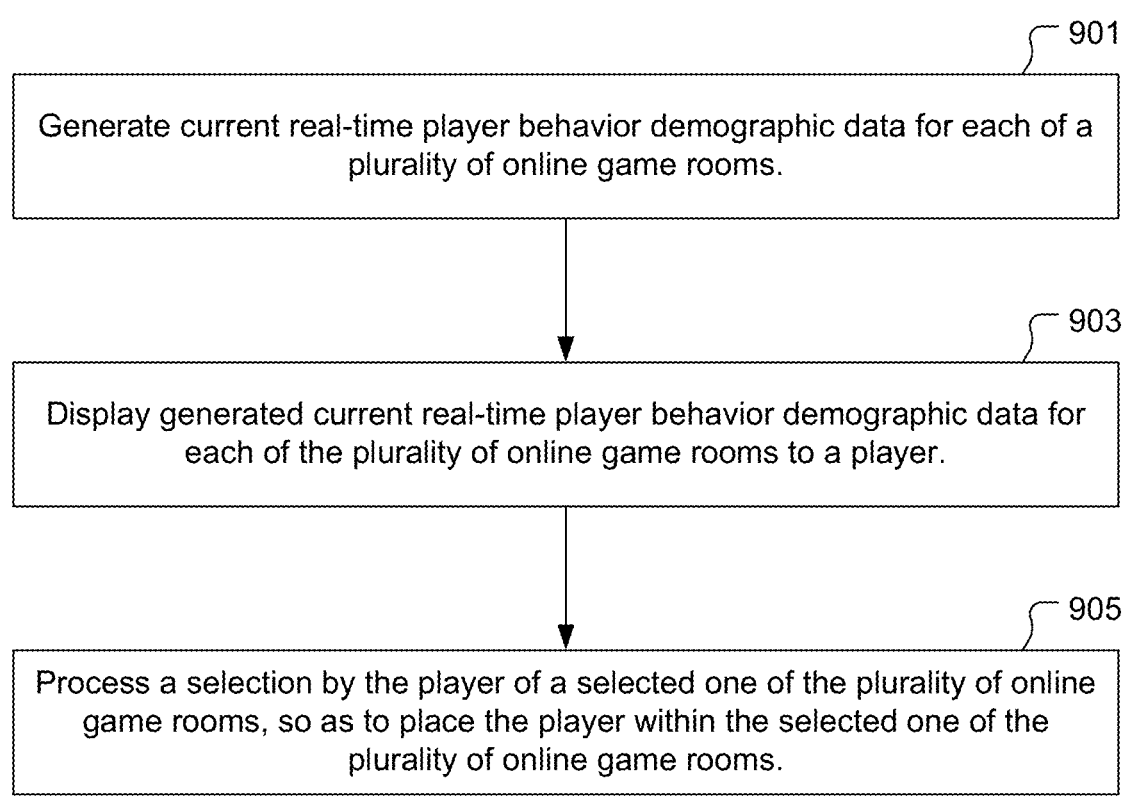
FIG. 9 shows a flowchart of a method for behavior-based game room selection in an online gaming system, in accordance with some embodiments.

FIG. 9 shows a flowchart of a method for behavior-based game room selection in an online gaming system, in accordance with some embodiments. The method includes an operation 901 for generating current real-time player behavior demographic data for each of a plurality of online game rooms. In some embodiments, the current real-time player behavior demographic data for a given one of the plurality of online game rooms includes a number of verified disruptive players currently within the given one of the plurality of online game rooms. In some embodiments, each verified disruptive player has been determined through a verification process to have committed at least one disruptive behavior within the online gaming system. In some embodiments, the verification process determines whether or not evidence exists to confirm an occurrence of a given disruptive behavior by a particular player. In some embodiments, the verification process is performed by one or more of a person, a crowd-sourced review panel, and a machine learning model.

In some embodiments, the current real-time player behavior demographic data for a given one of the plurality of online game rooms includes an average behavior score for players currently within the given one of the plurality of online game rooms. In some embodiments, the current real-time player behavior demographic data for a given one of the plurality of online game rooms includes a density of disruptive players currently within the given one of the plurality of online game rooms. In some embodiments, the current real-time player behavior demographic data for a given one of the plurality of online game rooms includes a current probability of encountering a disruptive player within the given one of the plurality of online game rooms. In some embodiments, the current real-time player behavior demographic data for a given one of the plurality of online game rooms includes a room-level behavioral status indicator for the given one of the plurality of online game rooms.

The method also includes an operation 903 for displaying the generated current real-time player behavior demographic data for each of the plurality of online game rooms to a player. The method also includes an operation 905 for processing a selection by the player of a selected one of the plurality of online game rooms. Processing the selection by the player of the selected one of the plurality of online game rooms places the player within the selected one of the plurality of online game rooms.

In some embodiments, the method includes generating a minimap for each of a plurality of online game rooms. In some embodiments, the minimap for a given one of the plurality of online game rooms shows designators of players at their respective current locations within the given one of the plurality of online game rooms, where each designator shown in the minimap for any player verified to have committed some disruptive behavior event within the online gaming system has a corresponding disruptor graphic applied within the minimap. In these embodiments, the method also includes displaying the minimap generated for each of the plurality of online game rooms to the player.

In some embodiments, an online gaming system is configured to implement the method of FIG. 9, including any optional and/or ancillary operations associated with the method of FIG. 9. In some embodiments, the online gaming system includes a computer memory that includes computer executable program instructions for identifying disruptive behavior events within the online gaming system. The computer executable program instructions include program instructions for performing the operations of the method of FIG. 9, including any optional and/or ancillary operations associated with the method of FIG. 9.

Figure 10:
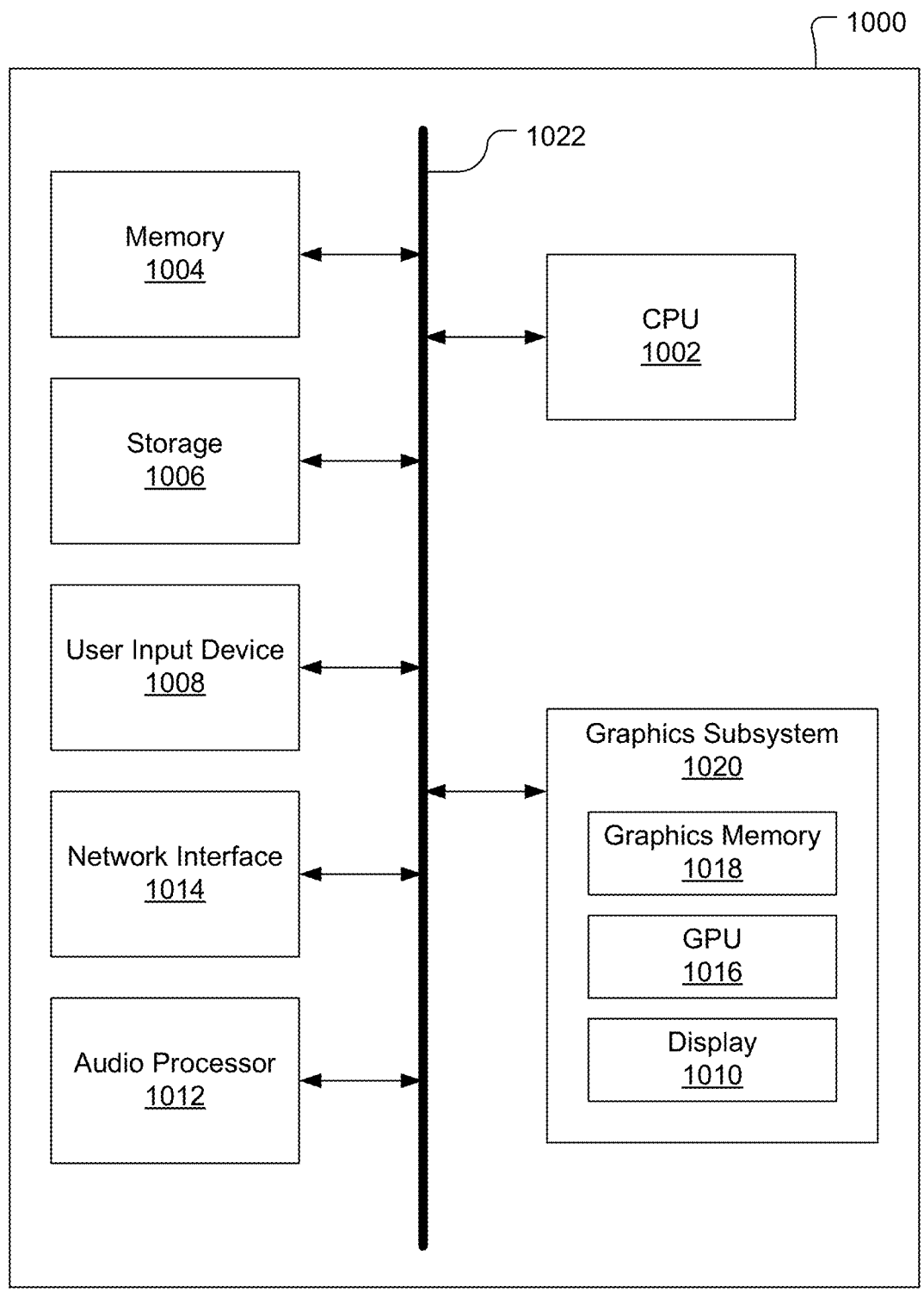
FIG. 10 shows an architecture of an example computing device that can be used to perform aspects of the various embodiments disclosed herein, in accordance with some embodiments.

FIG. 10 shows an architecture of an example computing device 1000 that can be used to perform aspects of the various embodiments disclosed herein, in accordance with some embodiments. In some embodiments, the computing device 1000 that can incorporate or can be a personal computer, a video game console, a personal digital assistant, a server, or another digital device, suitable for practicing an embodiment disclosed herein. The computing device 1000 includes a central processing unit (CPU) 1002 for running software applications and optionally an operating system. The CPU 1002 can include one or more homogeneous or heterogeneous processing cores. For example, in some embodiments, CPU 1002 is one or more general-purpose microprocessors having one or more processing cores. In some embodiments, the computing device 1000 includes one or more CPUs 1002 with microprocessor architectures specifically adapted for highly parallel and computationally intensive applications, such as processing operations of interpreting a query, identifying contextually relevant resources, and implementing and rendering the contextually relevant resources in a video game in an immediate manner. In some embodiments, the computing device 1000 is local to a player playing a game segment (e.g., a game console), or remote from the player (e.g., a back-end server processor), or one of many servers using virtualization in a game cloud system for remote streaming of gameplay to clients.

The computing device 1000 includes a computer memory 1004 that stores applications and data for use by the CPU 1002. The computing device 1000 includes a digital data storage device 1006 that provides non-volatile storage of digital data. In some embodiments, the storage device 1006 includes computer readable media for storing data for applications, gaming application, game telemetry, game play, user data, player state data, player metadata, and any other type of data associate with operation of the online gaming system 100. In some embodiments, the storage device 1006 includes one or more of fixed disk drives, removable disk drives, flash memory devices, CD-ROM discs, DVD-ROM discs, Blu-ray discs, HD-DVD discs, and optical storage devices, or other type of data storage media. The computing device also includes one or more user input devices 1008 that communicate user inputs from one or more users to the computing device 1000. In various embodiments, examples of the user input devices 1008 include, without limitation, a keyboard, a mouse, a joystick, a touch pad, a touch screen, a still camera, a video recorder/camera, a tracking device for recognizing gestures, and/or a microphone, among other types of user input devices. The computing device 1000 also includes a network interface 1014 that enables the computing device 1000 to communicate with other computer systems via a data communications network, which can include wired or wireless data communication over local area networks and wide area networks such as the Internet. The computing device 1000 also includes an audio processor 1012 that is configured to generate analog or digital audio output from instructions and/or data provided by the CPU 1002, the computer memory 1004, and/or the storage device 1006. The components of the computing device 1000, including the CPU 1002, the computer memory 1004, the storage device 1006, the user input devices 1008, the network interface 1014, and the audio processor 1012 are connected in data communication with each other through one or more data buses 1022.

In some embodiments, a graphics subsystem 1020 is connected with the data bus 1022 and the components of the computing device 1000. The graphics subsystem 1020 includes a graphics processing unit (GPU) 1016 and a graphics memory 1018. The graphics memory 1018 includes a display memory (e.g., a frame buffer) used for storing pixel data for each pixel of an output image. In various embodiments, the graphics memory 1018 can be integrated in the same device as the GPU 1016, connected as a separate device with the GPU 1016, and/or implemented within the graphics memory 1018. In some embodiments, pixel data can be provided to the graphics memory 1018 directly from the CPU 1002. Alternatively, in some embodiments, the CPU 1002 provides the GPU 1016 with data and/or instructions defining the desired output images, from which the GPU 1016 generates the pixel data of one or more output images. The data and/or instructions defining the desired output images can be stored in the computer memory 1004 and/or the graphics memory 1018. In some embodiments, the GPU 1016 includes 3D rendering capabilities for generating pixel data for output images from instructions and data defining the geometry, lighting, shading, texturing, motion, and/or camera parameters for a scene, such as for a scene within a online game served by the online gaming system 100. In some embodiments, the GPU 1016 also includes one or more programmable execution units capable of executing shader programs. The graphics subsystem 1020 periodically outputs pixel data for an image from the graphics memory 1018 to be displayed on a display device 1010. In various embodiments, the display device 1010 is any device capable of displaying visual information in response to a signal from the computing device 1000, including a CRT display, an LCD display, a plasma display, an OLED display, among other types of display devices. In various embodiments, the computing device 1000 can provide the display device 1010 with one or more of an analog signal, a digital signal and an optical signal.

It should be noted, that access services, such as providing access to online games within the online gaming system 100, can be provided over a wide geographical area and often use cloud computing. Cloud computing is a style of computing in which dynamically scalable and often virtualized resources are provided as a service over the Internet. Users do not need to be an expert in the technology infrastructure in the computing "cloud" that supports them. Cloud computing can be divided into different services, such as Infrastructure as a Service (IaaS), Platform as a Service (PaaS), and Software as a Service (SaaS). Cloud computing services often provide common online applications, such as video games, that are accessed from a web browser, while the software and data are stored on server computing systems in the cloud. The term cloud is used as a metaphor for the Internet, based on how the Internet is depicted in computer network diagrams and is an abstraction for the complex infrastructure it conceals.

In some embodiments, an online video game may be executed by a distributed game engine. In these embodiments, the distributed game engine may be executed on a plurality of processing entities, such that each processing entity executes a functional segment of a given game engine on which the online video game runs. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services performed by the game engine may include, for example, messaging, social utilities, audio communication, game play replay functions, help functions, etc. While game engines may sometimes be executed on an operating system virtualized by a hypervisor of a particular server, in other embodiments, the game engine itself is distributed among a plurality of processing entities, each of which may reside on different server units of a data center. In some embodiments, the plurality of processing entities include one or more of a server unit, a virtual machine, and a container, among other types of processing entities, depending on the needs of each game engine segment. For example, if a game engine segment is responsible for camera transformations, that particular game engine segment may be provisioned with a virtual machine associated with a graphics processing unit (GPU), since it will be doing a large number of relatively simple mathematical operations (e.g., matrix transformations). Also, by way of example, other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the online video game. From the perspective of the online video game and a video game player, the game engine being distributed across multiple compute nodes is indistinguishable from a non-distributed game engine executed on a single processing entity, because a game engine manager or supervisor distributes the workload and integrates the results seamlessly to provide online video game output components for the player.

In some embodiments, users/players access the remote services provided by the online gaming system 100 through client devices, which include a processor, a display, and input/output (I/O) device. In various embodiments, the client device can be a personal computer, a mobile phone, a netbook computer, a tablet computer, a personal digital assistant device, or another type of computing device. In some embodiments, a network interface controller executing on the game server recognizes the type of client device being used by the client and adjusts the data communication method between the game server and the client device as needed. In some embodiments, client devices use a standard communication method, such as HTML or TCP/IP, to access the game server over the Internet.

It should be appreciated that a given online video game or gaming application may be developed for a specific platform and a specific associated controller device. However, when such an online video game is made available via a game cloud system as mentioned herein, the user may be accessing the online video game with a different controller device. For example, a video game might have been developed for a game console and its associated controller, but the user might be accessing a cloud-based version of the video game from a personal computer utilizing a keyboard and mouse. In such a scenario, an input parameter configuration can define a mapping from inputs which can be generated by the user's available controller device (in this case, the keyboard and the mouse) to inputs which are acceptable for execution of the cloud-based version of the video game.

In another example, a user may access a cloud gaming system through a tablet computing device, a touchscreen smartphone, or other touchscreen driven device. In this example, the client device and the controller device are integrated together in the same device, with inputs being provided by way of detected touchscreen inputs/gestures. For such a device, an input parameter configuration may define particular touchscreen inputs corresponding to game inputs for the video game. For example, buttons, a directional pad, and/or other types of input elements might be displayed or overlaid during running of the online video game to indicate locations on the touchscreen that the user can touch to generate a game input. Also, gestures such as swipes in particular directions or specific touch motions may also be detected as game inputs. In some embodiments, a tutorial can be provided to the user indicating how to provide input through the touchscreen for gameplay, e.g., prior to beginning gameplay of the online video game, so as to acclimate the user to the operation of the controls on the touchscreen.

In some embodiments, the client device serves as a connection point for a controller device. More specifically, the controller device communicates through a wireless or wired connection with the client device to transmit inputs from the controller device to the client device. The client device may in turn process these inputs and transmit input data to the cloud game server through a network, which may be accessed through a local networking device such as a router. However, in other embodiments, the controller can itself be a networked device having an ability to communicate inputs directly through the network to the cloud game server, without being required to first communicate such inputs through the client device. For example, the controller might connect to a local networking device (such as the aforementioned router) for sending data to and receiving data from the cloud game server. Thus, while the client device may still be required to receive video output from the cloud-based video game and render it on a local display, input latency can be reduced by allowing the controller to send input data directly over the network to the cloud game server, so as to bypass the client device.

In some embodiments, a networked controller and a client device can be configured to send certain types of inputs directly from the controller to the cloud game server, and other types of inputs through the client device to the cloud game server. For example, inputs whose detection does not depend on any additional hardware or processing apart from the controller itself can be sent directly from the controller to the cloud game server through the network, so as to bypass the client device. Such inputs may include button inputs, joystick inputs, embedded motion detection inputs (e.g., inputs derived from an accelerometer, a magnetometer, and/or a gyroscope), among other types of inputs. However, inputs that utilize additional hardware or require processing by the client device can be sent from the controller to the client device, and then from the client device to the cloud game server. These inputs may include captured video or captured audio from the game environment that may require processing by the client device before being transmitted to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although some method operations may be described in a specific order herein, it should be understood that other housekeeping operations may be performed in between method operations, and/or method operations may be adjusted so that they occur at slightly different times or may be distributed in a system which allows the occurrence of the processing operations at various intervals associated with the processing, as long as the processing of the method operations are performed in a manner that provides for successful implementation of the method.

Some embodiments disclosed herein can be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. In some embodiments, the computer readable medium can include computer readable tangible medium distributed over a network-coupled computer system so that the computer readable code is stored and executed in a distributed fashion.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. A method for processing disruptive behavior within an online gaming system, comprising:
    identifying disruptive behavior events within an online gaming system;
    verifying players responsible for the identified disruptive behavior events;
    applying a behavioral designation to players in the online gaming system, the behavioral designation indicating whether or not a player is verified as responsible for one or more of the identified disruptive behavior events;
    automatically generating by a computer current real-time player behavior demographic data for a specified game space using the behavioral designations applied to players associated with the specified game space; and
    displaying the generated current real-time player behavior demographic data for the specified game space to a player associated with the specified game space to provide a control for adjusting a level of disruptive behavior to which the player is exposed during game play.

2. The method as recited in claim 1, wherein identifying disruptive behavior events within the online gaming system includes executing a machine learning model to process data associated with operation of the online gaming system.

3. The method as recited in claim 2, wherein the data processed by the machine learning model includes game telemetry data, user data, video data, chat data, and text data.

4. The method as recited in claim 1, wherein identifying disruptive behavior events within the online gaming system includes processing a disruptive behavior flagging report submitted by a player, the disruptive behavior flagging report including a description of a possible disruptive behavior, an identifier of a player responsible for the possible disruptive behavior, and evidence related to the possible disruptive behavior.

5. The method as recited in claim 4, wherein the evidence includes one or more of video data, chat data, and text data.

6. The method as recited in claim 1, wherein verifying players responsible for the identified disruptive behavior events includes performing a verification process to determine whether or not evidence exists to confirm an occurrence of a given identified disruptive behavior and one or more player responsible for the given identified disruptive behavior, the verification process performed by one or more of a person, a crowd-sourced review panel, and a machine learning model.

7. The method as recited in claim 1, wherein applying the behavioral designation to players in the online gaming system includes applying a disruptor graphic to a designator of a player verified to have committed a given disruptive behavior event within the online gaming system, the designator of the player being an avatar of the player or a symbol representing the player.

8. The method as recited in claim 7, wherein the disruptor graphic is visible in the online gaming system to players for which the given disruptive behavior event constitutes an unacceptable disruptive behavior.

9. The method as recited in claim 7, wherein the disruptor graphic is not visible in the online gaming system to players for which the given disruptive behavior event does not constitute an unacceptable disruptive behavior.

10. The method as recited in claim 7, wherein the disruptor graphic conveys a severity level of the given disruptive behavior event.

11. The method as recited in claim 7, wherein the given disruptive behavior event constitutes a globally unacceptable disruptive behavior within the online gaming system, and the disruptor graphic is visible to all players in the online gaming system.

12. The method as recited in claim 7, further comprising:
generating a minimap for a game space that shows designators of players at their respective locations within the game space, wherein each designator shown in the minimap for any player verified to have committed some disruptive behavior event within the online gaming system has a corresponding disruptor graphic applied within the minimap.

13. The method as recited in claim 1, wherein the current real-time player behavior demographic data for the specified game space includes a number of disruptive players currently within the specified game space.

14. The method as recited in claim 1, wherein the current real-time player behavior demographic data for the specified game space includes an average behavior score for players currently within the specified game space.

15. The method as recited in claim 1, wherein the current real-time player behavior demographic data for the specified game space includes a density of disruptive players currently within the specified game space.

16. The method as recited in claim 1, wherein the current real-time player behavior demographic data for the specified game space includes a current probability encountering a disruptive player within the specified game space.

17. The method as recited in claim 1, wherein the current real-time player behavior demographic data for the specified game space includes a room-level behavioral status indicator for the specified game space.

18. The method as recited in claim 1, wherein the current real-time player behavior demographic data for the specified game space is shown within a heads-up display within game video transmitted to players associated with the specified game space.

19. The method as recited in claim 1, wherein the current real-time player behavior demographic data for the specified game space is shown by displaying a current status of a room-level behavioral status indicator for the specified game space at a location within game video transmitted to players associated with the specified game space.

20. The method as recited in claim 1, further comprising:
generating a behavior profile for a given player, the behavior profile including a behavior history of the given player within the online game system, the behavior profile including behavior preferences of the given player within the online game system.

21. The method as recited in claim 20, wherein the behavior history of the given player includes a listing of verified disruptive behavior events committed by the given player within the online gaming system.

22. The method as recited in claim 20, wherein the behavior history of the given player includes a listing of verified good behavior events performed by the given player within the online gaming system.

23. The method as recited in claim 20, wherein the behavior preferences of the given player specifies one or more types of disruptive behavior within the online gaming system that is/are unacceptable to the given player.

24. The method as recited in claim 20, wherein the behavior preferences of the given player specifies a disruptive behavior tolerance level for the given player within the online gaming system.

25. The method as recited in claim 20, wherein the behavior profile includes a behavior score for the given player within the online game system.

26. A method for behavior-based game room selection in an online gaming system, comprising:
automatically generating by a computer current real-time player behavior demographic data for each of a plurality of online game rooms;
displaying the generated current real-time player behavior demographic data for each of the plurality of online game rooms to a player to provide a control for adjusting a level of disruptive behavior to which the player is exposed during game play; and
processing a selection by the player of a selected one of the plurality of online game rooms, the processing placing the player within the selected one of the plurality of online game rooms.

27. The method as recited in claim 26, wherein the current real-time player behavior demographic data for a given one of the plurality of online game rooms includes a number of verified disruptive players currently within the given one of the plurality of online game rooms.

28. The method as recited in claim 27, wherein each verified disruptive player has been determined through a verification process to have committed at least one disruptive behavior within the online gaming system, the verification process determining whether or not evidence exists to confirm an occurrence of a given disruptive behavior by a particular player, the verification process performed by one or more of a person, a crowd-sourced review panel, and a machine learning model.

29. The method as recited in claim 26, wherein the current real-time player behavior demographic data for a given one of the plurality of online game rooms includes an average behavior score for players currently within the given one of the plurality of online game rooms.

30. The method as recited in claim 26, wherein the current real-time player behavior demographic data for a given one of the plurality of online game rooms includes a density of disruptive players currently within the given one of the plurality of online game rooms.

31. The method as recited in claim 26, wherein the current real-time player behavior demographic data for a given one of the plurality of online game rooms includes a current probability of encountering a disruptive player within the given one of the plurality of online game rooms.

32. The method as recited in claim 26, wherein the current real-time player behavior demographic data for a given one of the plurality of online game rooms includes a room-level behavioral status indicator for the given one of the plurality of online game rooms.

33. The method as recited in claim 26, further comprising:
generating a minimap for each of a plurality of online game rooms, the minimap for a given one of the plurality of online game rooms showing designators of players at their respective current locations within the given one of the plurality of online game rooms, wherein each designator shown in the minimap for any player verified to have committed some disruptive behavior event within the online gaming system has a corresponding disruptor graphic applied within the minimap; and displaying the minimap generated for each of the plurality of online game rooms to the player.

34. An online gaming system, comprising:
a computer memory including computer executable program instructions for processing disruptive behavior within the online gaming system, the computer executable program instructions including program instructions for identifying disruptive behavior events within the online gaming system,
the computer executable program instructions including program instructions for verifying players responsible for the identified disruptive behavior events,
the computer executable program instructions including program instructions for applying a behavioral designation to players in the online gaming system, the behavioral designation indicating whether or not a player is verified as responsible for one or more of the identified disruptive behavior events,
the computer executable program instructions including program instructions for automatically generating current real-time player behavior demographic data for a specified game space using the behavioral designations applied to players associated with the specified game space, and
the computer executable program instructions including program instructions for displaying the generated current real-time player behavior demographic data for the specified game space to a player associated with the specified game space to provide a control for adjusting a level of disruptive behavior to which the player is exposed during game play.

35. An online gaming system, comprising:
a computer memory including computer executable program instructions for behavior-based game room selection in the online gaming system,
the computer executable program instructions including program instructions for automatically generating current real-time player behavior demographic data for each of a plurality of online game rooms,
the computer executable program instructions including program instructions for displaying the generated current real-time player behavior demographic data for each of the plurality of online game rooms to a player to provide a control for adjusting a level of disruptive behavior to which the player is exposed during game play, and
the computer executable program instructions including program instructions for processing a selection by the player of a selected one of the plurality of online game rooms, the processing placing the player within the selected one of the plurality of online game rooms.

* * * * *